US008069186B2

(12) United States Patent
Farnham et al.

(10) Patent No.: US 8,069,186 B2
(45) Date of Patent: Nov. 29, 2011

(54) COMPUTER SYSTEM ARCHITECTURE FOR AUTOMATIC CONTEXT ASSOCIATIONS

(75) Inventors: Shelly D. Farnham, Seattle, WA (US); Andrzej Turski, Redmond, WA (US); David P. Vronay, Bellevue, WA (US); Lili Cheng, Bellevue, WA (US); Sean U. Kelly, Seattle, WA (US); Cezary Marcjan, Redmond, WA (US); Richard F. Rashid, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 548 days.

(21) Appl. No.: 12/045,104

(22) Filed: Mar. 10, 2008

(65) Prior Publication Data
US 2008/0222170 A1  Sep. 11, 2008

Related U.S. Application Data

(63) Continuation of application No. 10/187,047, filed on Jun. 28, 2002, now Pat. No. 7,343,365.

(51) Int. Cl.
*G06F 17/30* (2006.01)
(52) U.S. Cl. ...................................................... 707/802
(58) Field of Classification Search .................. 707/708; 715/711
See application file for complete search history.

(56) References Cited

U.S. PATENT DOCUMENTS

| | | | |
|---|---|---|---|
| 5,956,486 A | 9/1999 | Hickman | |
| 6,052,121 A | 4/2000 | Webster et al. | |
| 6,125,366 A | 9/2000 | Bernstein et al. | |
| 6,330,676 B1 * | 12/2001 | Kelsey | 726/7 |
| 6,369,840 B1 | 4/2002 | Barnett et al. | |
| 6,374,145 B1 * | 4/2002 | Lignoul | 700/17 |
| 6,380,959 B1 | 4/2002 | Wang et al. | |
| 6,389,372 B1 | 5/2002 | Glance | |
| 6,473,752 B1 | 10/2002 | Fleming, III | |
| 6,480,885 B1 | 11/2002 | Olivier | |
| 6,530,081 B1 * | 3/2003 | Hayes, Jr. | 717/176 |
| 6,560,711 B1 * | 5/2003 | Given et al. | 726/34 |
| 6,594,463 B2 | 7/2003 | Watanabe | |
| 6,665,805 B1 * | 12/2003 | Tsirkel et al. | 713/323 |
| 6,675,197 B1 | 1/2004 | Satoh | |
| 6,681,108 B1 | 1/2004 | Terry | |
| 6,691,162 B1 | 2/2004 | Wick | |
| 6,714,967 B1 | 3/2004 | Horvitz | |
| 6,748,395 B1 | 6/2004 | Picker et al. | |
| 6,816,885 B1 | 11/2004 | Raghunandan | |
| 6,832,245 B1 * | 12/2004 | Isaacs et al. | 709/206 |
| 6,868,525 B1 * | 3/2005 | Szabo | 715/738 |
| 6,922,488 B2 * | 7/2005 | Mastrianni et al. | 382/199 |

(Continued)

OTHER PUBLICATIONS

U.S. Appl. No. 10/187,047.*

(Continued)

*Primary Examiner* — Sheree Brown
(74) *Attorney, Agent, or Firm* — Lee & Hayes, PLLC

(57) ABSTRACT

A computer system models human memory by deriving associations between objects, events, and the context of the computer user or users. These associations can be dynamically generated, changing depending on the behavior of the user and context. Examples of areas in which this system can be used include time management (e.g., a calendar that presents time-based groupings of objects), people management (e.g., use analysis of user communications to rank importance of people to the user, groupings, and associations between people/groups and other objects such as documents, email), and general computer management (e.g., use analysis of user behavior to identify important objects and objects that are related to a current focus and context of the computer user).

19 Claims, 17 Drawing Sheets

U.S. PATENT DOCUMENTS

| | | | |
|---|---|---|---|
| 7,100,203 B1* | 8/2006 | Tosey | 726/17 |
| 7,167,910 B2* | 1/2007 | Farnham et al. | 709/223 |
| 7,181,438 B1* | 2/2007 | Szabo | 1/1 |
| 7,203,911 B2* | 4/2007 | Williams | 715/864 |
| 7,274,375 B1 | 9/2007 | David | |
| 7,328,241 B2* | 2/2008 | Ribak et al. | 709/204 |
| 7,343,365 B2* | 3/2008 | Farnham et al. | 715/853 |
| 2002/0073056 A1* | 6/2002 | Broster et al. | 707/1 |
| 2002/0138477 A1 | 9/2002 | Keiser | |
| 2003/0158855 A1 | 8/2003 | Farnham et al. | |
| 2003/0167324 A1 | 9/2003 | Farnham et al. | |
| 2003/0229648 A1* | 12/2003 | Tang et al. | 707/104.1 |
| 2004/0003028 A1 | 1/2004 | Emmett et al. | |
| 2004/0088325 A1 | 5/2004 | Elder et al. | |
| 2004/0135816 A1 | 7/2004 | Schwartz et al. | |
| 2004/0148346 A1 | 7/2004 | Weaver et al. | |
| 2004/0230599 A1 | 11/2004 | Moore et al. | |
| 2004/0267701 A1 | 12/2004 | Horvitz et al. | |
| 2005/0027845 A1 | 2/2005 | Secor et al. | |
| 2005/0256956 A1 | 11/2005 | Littlefield et al. | |
| 2006/0075044 A1 | 4/2006 | Fox et al. | |
| 2006/0170705 A1 | 8/2006 | Wilson | |
| 2006/0190493 A1 | 8/2006 | Kawai et al. | |
| 2007/0192299 A1 | 8/2007 | Zuckerberg et al. | |

OTHER PUBLICATIONS

Helmut Berger, et al., An Adaptive Information Retrieval System based on Associative Networks, APCCM 2004, 2004, pp. 27-36, Dunedin, New Zealand.

Bent Bruun Kristensen, Complex Associations: Abstractions in Object—Oriented Modeling, OOPSLA 94, 1994, pp. 272-286, Portland, Oregon, USA.

European Search Report, EP 03 00 2118, mailed Nov. 19, 2007.

Marc A. Smith, et al., "Visualization Components for Persistent Conversations", Proceedings of the SIGCHI Conference on Human Factors in Computing Systems, Mar. 31-Apr. 5, 2001, pp. 136-143, vol. 3, No. 1, Seattle, WA.

Richard B. Segal, et al., "MailCat: An Intelligent Assistant for Organizing E-Mail", Proceedings of the Third Annual Conference on Autonomous Agents, 1999, pp. 276-282, Yorktown Heights, NY.

Nicholas Ducheneaut, et al., "E-Mail as Habitat: An Exploration of Embedded Personal Information Management", Interactions, Sep./Oct. 2001.

A. Cyper, Eager: Programming Repetitive Tasks by Demonstration, 1993, pp. 205-217, MIT Press, Cambridge MA.

G. A. Miller, The Magical Number Seven Plus or Minus Two: Some Limits on Our Capacity for Processing Information, 1956, pp. 81-97, Psychological Review, 63.

R. Mander, et al., A 'Pile' Methaphor for Supporting Casual Organization of Information, May 3-7, 1992, pp. 627-634, CHI'92.

D.E. Rose, Content Awareness in a File System Interface: Implementing the 'Pile' Metaphor for Organizing Information, pp. 260-269, Jun. 1993, SIGIR'93, ACM, Pittsburg, PA. USA.

S.U. Kelly, Designing for Improved Social Responsibility, User Participation and Content in On-Line Communities, pp. 391-398, Apr. 20-25, 2002, CHI 2002, Minneapolis, Minnesota, USA.

E. Backer, Computer-assisted Reasoning in Cluster Analysis, New-York, Prentice Hall, 1995.

M. Heidegger, Being and Time, 1927.

J. Raskins, The Humane Interface, 2001.

M.T. Nietzel, Introduction to Clinical Psychology, 3rd Edition, 1991, Prentice Hall, Englewood Cliffs, NI.

Brown, "Kernel Traffic", retrived at <<http://www.kerneltrafic.org>> on Feb. 1, 2005.

Brown, "Kernel traffic #293 for Jan. 9", <<http://kerneltraffic.org/kernel-traffic/latest.html>> on Jan. 17, 2005.

* cited by examiner

COMPUTER SYSTEM ARCHITECTURE FOR AUTOMATIC CONTEXT ASSOCIATIONS

CROSS-REFERENCE

This is a continuation application of U.S. patent application Ser. No. 10/187,047, filed Jun. 28, 2002, entitled "COMPUTER SYSTEM ARCHITECTURE FOR AUTOMATIC CONTEXT ASSOCIATES". The entireties of these applications are hereby incorporated by reference.

TECHNICAL FIELD

The present invention relates to computer user interfaces and, in particular, to an automatic context association system that identifies associations between computer objects and accesses them based in accordance with user context.

BACKGROUND AND SUMMARY

When they were originally designed, personal computers were commonly used for just a relatively narrow range of applications. Computers, including portable and hand-held computing devices, are now used for a wide variety of applications and communication formats. As a result, computer users currently must organize much more information, as well as different types of information, than when computers were originally designed.

Conventional computer file systems force users to use and remember arbitrary, out-of-context filing structures, including file names, hierarchical directory structures, etc. In contrast, innate human memory works by association so that events are often remembered as happening in relationship to other events. With the significant numbers of computer files and computer information that many users interact with, conventional computer filing structures and organizations can make it difficult or impossible for users to find and access computer information they previously worked with or used.

Likewise, current communication and member directory services use static, user generated information to organize contact information. People or contacts tend to be organized alphabetically or according to file hierarchies. For example, in member directory services people are commonly organized according to formal, organizational hierarchical structures. However, many relationships and groups are much more dynamic than formal, organizational hierarchical structures and people do not intuitively arrange their contacts alphabetically or according to topical hierarchies.

Accordingly, the present invention provides an automatic context association system that identifies associations between computer objects and accesses them based in accordance with user context. The context association system provides access to computer files, documents, contacts, etc. (i.e., "objects) based upon contextual associations that are determined automatically, thereby accommodating the association basis on which innate human memory works. The context association system allows a user to view and assign searchable metadata and to retrieve documents, objects or files that match selected metadata.

In one implementation, context association system includes a system database of metadata relating to computer objects accessed or activities carried out on a computer with different user-operated software applications. The metadata is analyzed to determine the extents of association between the computer objects or activities of different user-operated software applications. Based upon a context in which a computer user is using a computer, context association system provides computer objects that are associated with the user's context.

In another implementation, a calendar user interface system utilizes a calendar as a top-level user interface for accessing computer information. The context association system utilizes system-wide monitoring of the user and associations between various computer files, people, and other information related to the user. This allows a user to view and assign searchable metadata (e.g., metadata relating to associated dates) and to retrieve computer information that matches selected metadata. This implementation automatically associates and tracks time-related events, user computer activities, and information related to when the user works with documents, etc. on the computer. In another implementation, users are provided a web-based, interactive map that allows users to navigate for information using social, relational ties such as who is working with whom, who is working on which projects, and who is working in which groups.

Additional objects and advantages of the present invention will be apparent from the detailed description of the preferred embodiment thereof, which proceeds with reference to the accompanying drawings.

BRIEF DESCRIPTION OF THE DRAWINGS

FIG. 14 is an illustration of an exemplary implementation of an overview calendar-based user interface rendered on a computer display screen.

FIG. 15 is an illustration of an exemplary implementation of a "when" tab of a calendar search user interface rendered on a computer display screen.

DETAILED DESCRIPTION OF PREFERRED EMBODIMENTS

Figure 1:
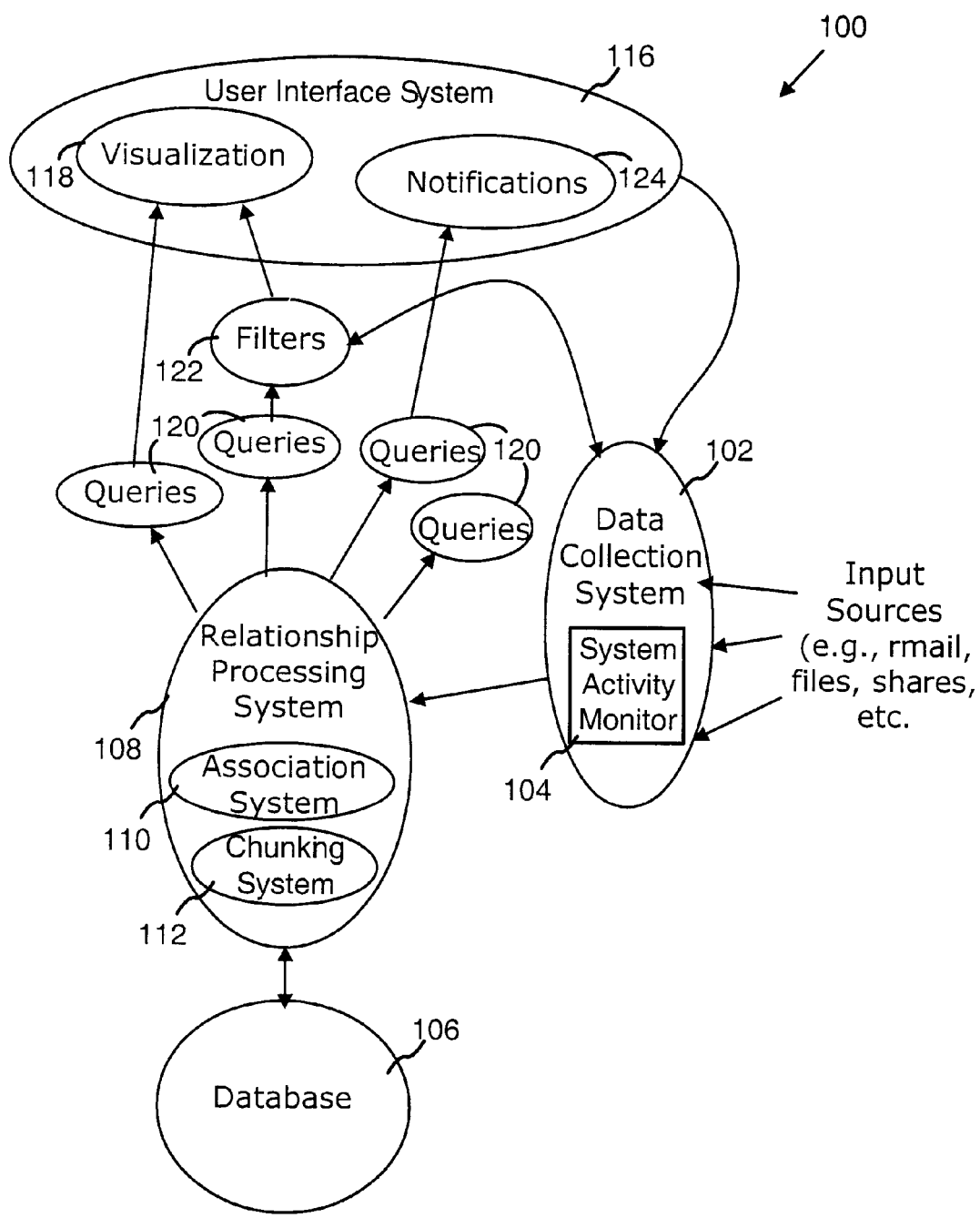
FIG. 1 is a functional block diagram of an automatic context association system that automatically determines context associations between user computer activities, computer objects (e.g., files, contacts, etc.), and other events.

FIG. 1 is a functional block diagram of an automatic context association system 100 that automatically determines context associations between user computer activities, computer objects (e.g., files, contacts, etc.), and other events. The context associations allow context association system 100 to provide users with automatic access to related computer files, contacts, and information (referred to generally as objects).

As described below, context associations between the objects may include similarities between them and their importance. The importance of and similarities between objects may be determined from user computer interactions with the objects. The user computer interactions may occur on a conventional desktop or laptop computer, or any other user-operated computing device such as a handheld computer, a digital cellular telephone, etc. For purposes of simplicity, these types of devices are referred to herein generally as computers. Context association system 100 may be implemented as software that is stored on and executed by one or more such computers.

Context association system 100 includes a data collection system 102 that collects data relating to user computer activities, computer actions, interactions between the user and various computer objects (e.g., applications, files, communications, etc.), and other events. For example, data collection system 102 may collect data relating to computer system events (e.g., the operation of applications or other software elements, various operations on computer files, sharing of computer data or other objects, etc.) computer communications (e.g., email communications, instant messaging communications, etc.), and external data (e.g., news, events, etc.)

In one implementation, data collection system 102 may include a system activity monitor 104, for example, that monitors user activity on a user-operated computer (not shown). System activity monitor 104 may be implemented as a computer program to which other applications, or the operating system, provide information of user computer activities, such as search queries, the opening or modification of a document or other file, etc. For example, while objects may exhibit many properties, searches performed by a user and the search results can indicate which properties are most important for the user. For each such activity, system activity monitor 104 creates or adds to a record of information (sometimes called "metadata") that is stored in a computer system database 106.

For example, system activity monitor 104 may include a universal input activity monitor that provides a single entry point for all user interactions with the computer, or at least specified user interactions with the computer. In this universal input implementation, system activity monitor 104 may determine and store as metadata in computer system database 106 any or all of the following: input method data (e.g., text, speech, mouse, etc.), input language data (English, Chinese, etc.), input mode data (e.g., dictation or typed command), input assistance data (e.g., typed word completion, command guessing, etc.), input feedback data (e.g., whether the computer needs additional information, corrections of wrong guesses by the computer, etc.), etc. For instance, if a user copies or stores a picture in a web browser, system activity monitor 104 could store the network address (e.g., Uniform Resource Locator, URL) of the source page, as well as the URL of the image itself, as metadata in computer system database 106.

Computer system database 106 stores information (e.g., "metadata") about computer files stored on and activities carried out on a computer. The metadata may include conventional information, such as is conventional for computer-generated documents, including when the file was created, who created it, and a modification history. Also, some types of computer file types may have specific metadata fields that are not applicable to other file types. For instance, the metadata fields for a photo file type may include the size of the image, where the picture was taken, who took it, who is in it, etc. In one implementation, new metadata fields can be added to database system 106 to accommodate new file types or to store new information about an existing file type.

Table 1A lists exemplary information that may obtained by system activity monitor 104 and stored in computer system database 106. With regard to the various computer files and computer information (referred to collectively as objects) a computer user might interact with, system activity monitor 104 may collect data relating to any or all of the creator/author of the object, the type of the object, any pointer to the object (if available), activation events, object size, etc. For example, system activity monitor 104 may obtain the information about the objects with which a computer user interacts, determine whether the objects are new or unique relative to other objects listed in computer system database 106 (e.g., based upon a unique object identifier), and aggregate or store the activities in computer system database 106 in association with the unique object identifier of the object.

TABLE 1A

| Data Collection and Analysis | | |
| --- | --- | --- |
| | Operationalization | |
| Constructs | Data Collecting | Data Processing |
| Objects Users Interact With | | |
| General | creator/author of object, type of object, pointer to object if it still exists, activation events, object size | get information about objects, determine if new/unique & aggregate events at level of unique object ID |

TABLE 1A-continued

Data Collection and Analysis

| Constructs | Operationalization | |
|---|---|---|
| | Data Collecting | Data Processing |
| People | | |
| people in user's email | email client aliases | |
| people in user's contact list | contact list files | |
| people users IM, Chat with Communications | buddy list email aliases | |
| Emails | email events (open, close), email addresses | |
| phone messages | phone message events (open, close), email alias | |
| instant messages | instant message (IM) session events (open, close), people | |
| chat messages | chat session events | |
| Files | | |
| any file created, opened, saved, played, sent, etc. | file names, place in directory | |
| Web items | | |
| web pages | URLs | |
| streaming items played | URLs | |
| Notifications | type of notification, response notification | |
| Applications | pointer to application | |

The objects with which the computer user interacts may be associated with other people, communications with other people, computer files, network or Web items, computer system notifications, and applications run on or accessible by the computer. System activity monitor 104 can obtain and store in computer system database 106 for each of the listed types of exemplary information.

Context association system 100 includes a relationship processing system 108 that determine one or more relationships between objects or metadata obtained by data collection system 102 or stored in computer system database 106. In one exemplary implementation, relationship processing system 108 includes a similarity or association system 110 that determines a degree of similarity or association between at least a pair of computer files or objects. Similarity or the degree of association may be represented, for example, as a numeric value between 0 and 1, where 1 would be identity between objects and 0 would indicate they are completely unrelated. Association system 110 may be implemented as one or more programs that, for a given target file and a collection of other files, return a similarity ranking between them.

It will be appreciated that different types of documents, files, or objects can have different types of similarity. For instance, two photos can look similar, could be taken at similar times, could be of a similar person, place, or event, could be the same color, could have been sent to the same people or printed together, could be parts of the same photo (e.g., one could have been cut from the other), etc. Table 1B lists exemplary associations or similarities that association system 110 may identify and store in computer system database 106. As indicated, the associations or similarities may relate to objects or files having shared content, occurring at similar times or similar computer locations (e.g., computer, directory, etc.), being sent to or received from a common person, are be linked together.

TABLE 1B

Data Collection and Analysis

| Constructs | Operationalization | |
|---|---|---|
| | Data Collecting | Data Processing |
| Context: Associations between Objects | | |
| Having shared content | | |
| | cut/paste event, insert event, objects saved as event, objects | |
| Occurring near in time | | |
| open on same machine at same time | open/close activation events, objects, date time of events | distance across times, overlapping sessions |
| Occurring near in "place" | | |
| on same machine | machine name | |
| near each other in directory | place in directory structure | min number of jumps through tree from one to the other |
| near each other in web | link event, links from, links to | store metadata in computer system database |
| on the same email | attachment events, objects | aggregate at level of communication |
| Being sent/received to one another | | |
| item sent to another person | sent event, objects | |
| pointer of item sent to another person | insert event, objects | |
| opened by a person | open event, objects | |
| saved by a person | save event, objects | |
| Activating one from within the other | | |
| items downloaded from a web page | download event, objects | |
| linked via a URL | link event, objects, link from, link to | |

In one implementation, association system 110 could be instructed to ignore certain types of similarity, or to weight one type of similarity more heavily than another. Moreover, the associations or similarities tracked and identified by association system 110 could be extensible.

In addition, objects with which a user interacts can be of a different importance or significance to the user. For instance, a document that a user keeps open and edits of an extended period could be deemed to be of greater importance than a document that is opened for only a brief period of time. Likewise, a photo that is accessed and opened repeatedly could be deemed to be of greater importance that a photo that is only opened once. Table 1C lists exemplary factors by which association system 110, for example, could determine and store in computer system database 106 the relative importance of objects. As indicated, the importance factors may relate to the duration of user interactions, the frequency of interactions, the recency of interactions, as well as the immediacy of user responses, the amount of copying, duplication, and backups, and the extent objects are shared.

TABLE 1C

Data Collection and Analysis

| Constructs | Operationalization | |
|---|---|---|
| | Data Collecting | Data Processing |
| Importance of Objects | | |
| Duration of interaction | open and close activation events, object | session times calculated by min max time/date, then summed by object |
| | keyboard events, mouse events, object | summed by object |
| Frequency of interaction | activation events, date/times | count of unique activations/sessions |
| Recency of interaction | activation events, date/times | get maximum date |
| Immediacy of response to | | difference in time |
| Copying, duplication, backups | print, save as, multiple versions | |
| Sharing | show during meeting, share via email, etc. | |

Relationship processing system 108 may further include a chunking system 112 that uses the degrees of similarity or association determined by similarity or association system 110 for an arbitrarily large set of objects or files and groups or "chunks" them into a specified number of sub-groups. For instance, given 100 photos, chunking system 112 could separate them into any number of sub-groups or chunks based on one or more criteria such as the dates they were taken, or who is in the photos, for example. The criteria to be used by chunking system 112 may be pre-defined or specified by a user, for example, and in one implementation can place the same item into several chunks (e.g., a picture of Bob and Sue would go into a Bob chunk as well as a Sue chunk). Chunking system 112 may be implemented as one or more programs stored on the computer.

A context association user interface system 116 utilizes information stored in computer system database 106 by system activity monitor 104, as well as information determined by similarity or association system 110 and chunking system 112 to display visualizations 118 illustrating context associations between computer system files, computer information, and other information. Visualizations 118 may be based upon the results of database queries 120 to which, in some instances, data filters 122 are applied. In addition, user interface system 116 can provide application and system notifications 1243, as described below in greater detail.

Accordingly, context association system 100 accommodates innate human memory, which works by association so that events are often remembered as happening in relationship to other events. In contrast, conventional computer file systems force users to use and remember arbitrary, out-of-context filing structures. With the significant numbers of computer files and objects that many users interact with, conventional out-of-context filing structures can make it difficult, or impossible, for users to find and access computer information that was worked on or viewed in the past. Context association system 100 allows a user to view and assign searchable metadata and to retrieve documents, objects or files that match selected metadata.

Figure 2:
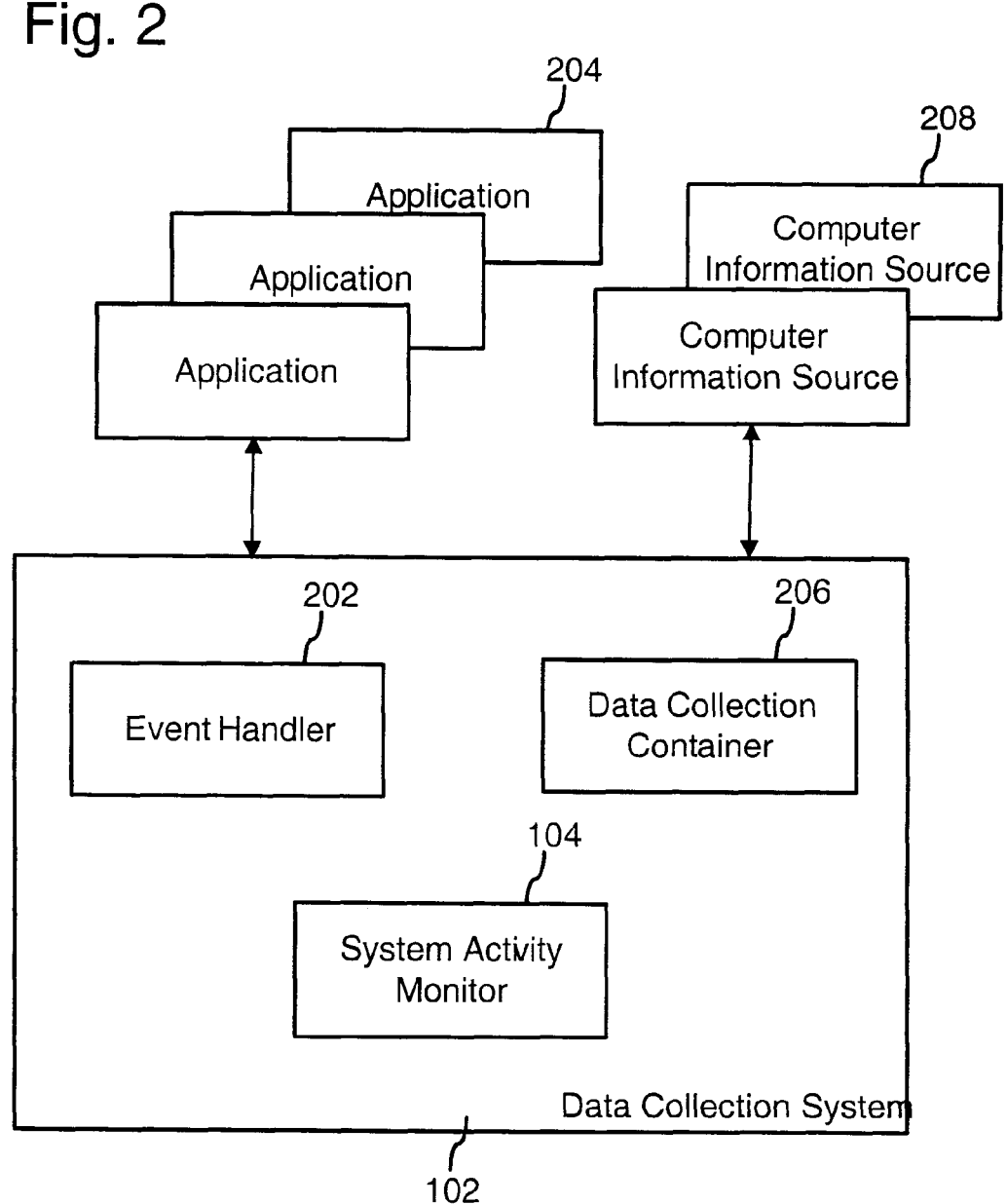
FIG. 2 is a detailed block diagram of one implementation of a data collection system in the context association system of FIG. 1.

FIG. 2 is a detailed block diagram of one implementation of data collection system 102. In addition to system activity monitor 104 for monitoring user computer activity, for example, data collection system 102 can also include any or all of the following, including an event handler 202 through which one or more applications 204 (including other software services) send metadata information about application events to data collection system 102 and receive metadata information about application events from data collection system 102. Applications 204 may be separate from an underlying operating system for the computer, or may be services or features provided by the operating system.

A data collection container 206 operates to control system activity monitor 104, event handler 202, and any other data collection modules, and particularly controls data collection relating to system activity, copy and paste between documents, incoming and outgoing messages, opening shared files, etc. In addition, data collection container 206 can operate to obtain or receive common data (like weather, news), other than data relating specifically to operation or use of the computer, from one or more separate computer information sources 208 (e.g., public servers).

Applications 204 running on a computer with automatic context association system 100 could register with event handler 202 to receive enhanced document management functionality. In particular, data collection container 206 supports cross-application integration that allows collection of data or information about cross-application events, such as copy and paste between documents, attaching a document to an email message, etc., thereby allowing relationships between objects to be determined or derived by relationship processing system 108. Moreover, applications 204 can interact directly with data collection system 102 to provide contextual information not readily available to system activity monitor 104. For example, if an email attachment is saved to disk as a separate file, the email application 204 may create a link between this file and the original email message (and, by extension, with the message sender). Control system activity monitor 104 and event handler 202 allow data to be collected at high efficiency and at a high granularity level, and with the minimal amount of processing required. In addition, data collection system 102 in one implementation may be extensible to allow for the installation of additional data collectors that may be developed in the future.

In one implementation users are notified that the data is collected and what it is used for. Users are provided one or more controls to selectively enable or disable the data collection, or explicitly adjust the importance of objects and their association weights, as described below. In other implementations, the ways in which the data is collected may be modified automatically based on how the data is used. While data is typically collected at the level of an individual user and computer, it will be appreciated that the data from multiple users and their computers could be combined. For such a shared data implementation, system 100 will provide unique identifiers for the data, objects and sessions, consistent handling of to- and from-fields for communications, replication of event identifiers across computers in shared sessions, privacy, and so forth.

Figure 3:
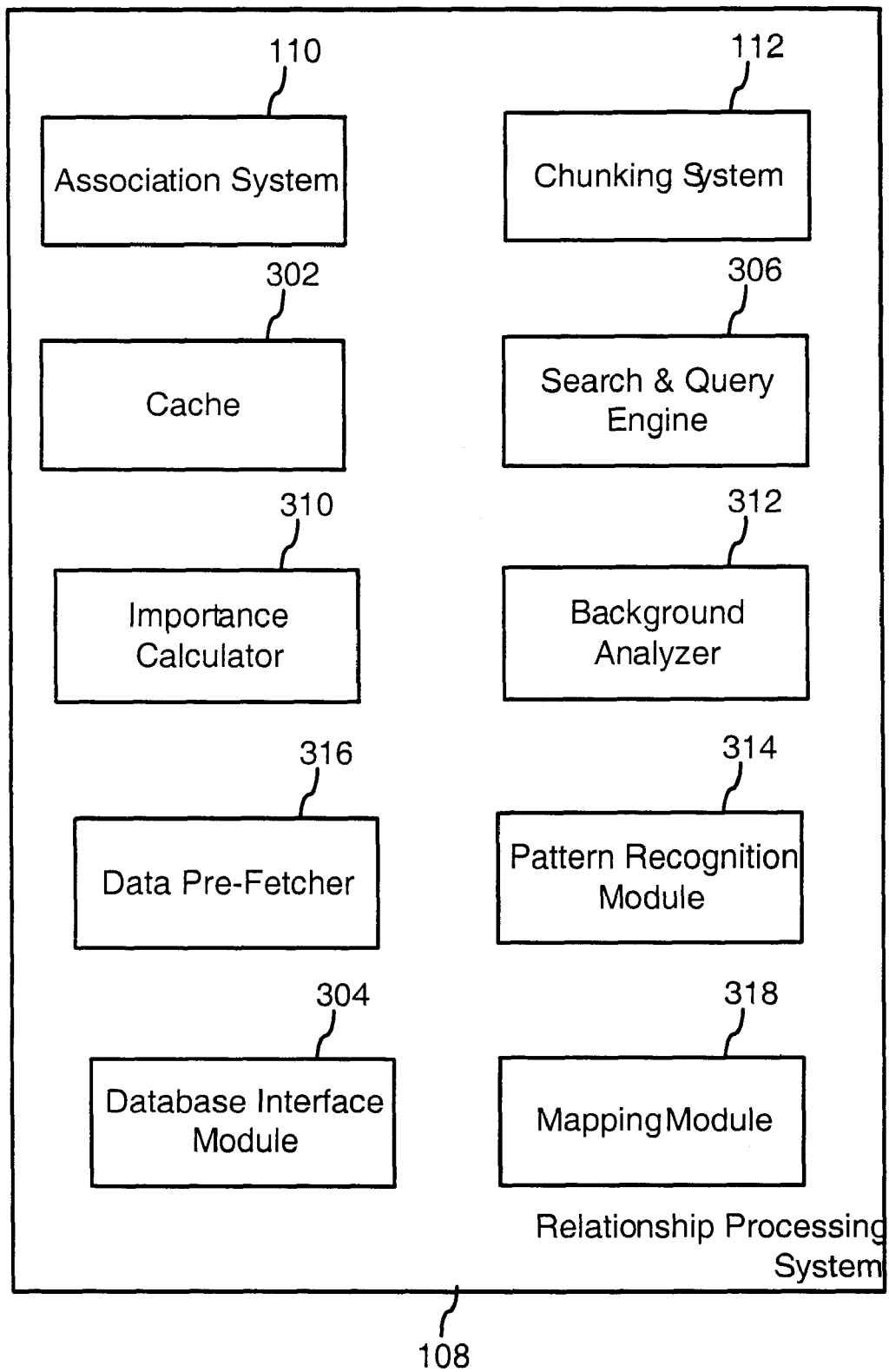
FIG. 3 detailed block diagram of one implementation of relationship processing system 108.

FIG. 3 is a detailed block diagram of one implementation of relationship processing system 108. In addition to association system 110 and chunking system 112, for example, relationship processing system 108 can further include any or all of a variety of other components. In connection with accessing and interfacing with database 106, relationship processing system 108 can include a cache 302 to store temporarily metadata so that associations, such as second order associations, can be determined more readily than if the data had to be retrieved from database 106 for each association determination. Information in database 106 can be accessed through a database interface module 304 to unify and standardize the manner of adding data from various sources to database 106, and a search and query engine 306 can provide access to the data in database 106.

Association system 110 can determine direct or indirect relationships between two objects or make relationship measurements according to selected criteria, as described below with reference to exemplary implementations relating to social relationships between people and date-based relationships between various objects. Likewise, an importance calculator 310 can calculate the importance of an object based on the history of user interactions with it.

For example, importance calculator 310 can return an importance ranking between a target object and one or more other objects. Importance can be represented as a number between 0 and 1, where 1 would be absolute importance and 0 would be completely unimportant. Importance may be determined by a number of calculations of recency, number of edits, sending or receipt of a document from a frequently contacted user, duration, read order, frequency, etc. The extent of similarity or association (from the association system 110), importance (from importance calculator 310), and context may be combined to determine an extent of association between objects, etc.

It will be appreciated that importance and association rankings can vary according to the context of an event. An importance ranking may be provided for a target file in a particular context, which may include a file or collection of other files or a project, a particular time of day, a particular application or service, etc. For example, a user can receive email from her architect in the context of her house construction project. The context is an object or set of objects in the system. This could be one or more files, applications, or persons, a time of day, etc.

In some implementations, relationship processing system 108 can include a background analyzer 312 that operates on metadata from database 106 other than in response to a current database query to generate additional metadata. For example, background analyzer 312 could apply face recognition to graphic files and apply metadata tags when pre-defined faces are recognized. Likewise, a pattern recognition module 314 could seek to identify non-trivial repetitive user tasks from user activities. A data pre-fetcher 316 could provide "smart" pre-fetching of metadata for a current task from database 106 or cache 302.

In connection with providing additional data analysis, relationship processing system 108 may further include any or all of the following components. A mapping module 320 can provide spatial representations (e.g., two-dimensional) of data based on relationships, and the spatial representations can then be used to render and navigate graphical relationship maps or visualizations, one of which is described below with reference to a social map implementation. Clustering or "chunking" module 112 functions to group a given set of data objects into multiple clusters, "chunks," or sub-groups according to predefined criteria.

Chunking module 112 may selectively apply strict categorization, in which each data object is associated with only one sub-group, or fuzzy categorization in which data objects may be associated with more than one sub-group. In addition, relationship processing system 108 may include modules (not shown) to provide filtering of data objects based on a user's current task context and type of relationship, sorting of objects based on the current task context and type of relationship, prediction/automation to generate or find a set of data objects based on a user's current context and recorded patterns, and a search-by-relationship module that searches for data objects that are related to a selected one, such as searching for data objects related to a person (emails, docs, meetings, photos . . . ), for example.

Figure 4:
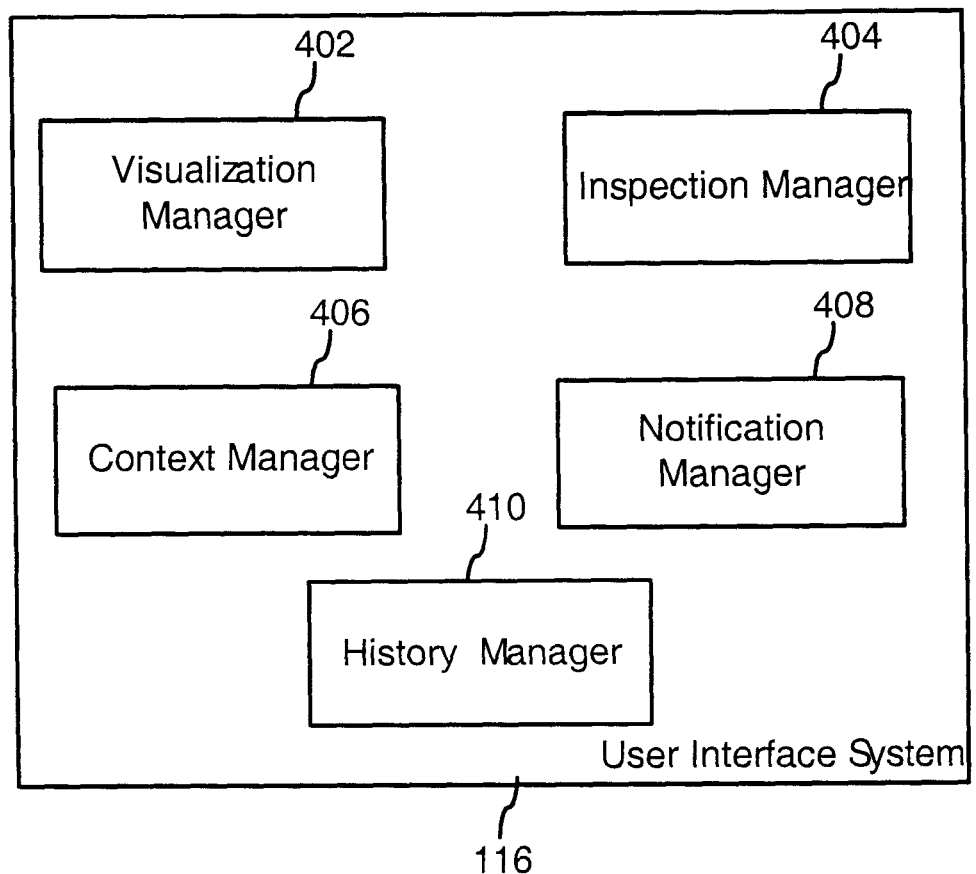
FIG. 4 is a detailed block diagram of one implementation of a context association user interface system in the context association system of FIG. 1

FIG. 4 is a detailed block diagram of one implementation of context association user interface system 116, which can include any or all of the following components. A visualization manager 402 provides visualizations (e.g., graphical) that can be rendered on computer display screens for sets of data, as described below in greater detail. In some implementations, new visualizations can be added to visualization manager 402 and the visualizations can exist across application contexts. Examples of visualizations that can be provided by visualization manager 402 include stacks of objects (e.g., photos), data maps (e.g., a map of social relationships between people, as described below), hierarchies, calendars, etc. An inspection manager 404 can provide a standard way or format for obtaining and displaying relevant information about a particular item in a particular context, such as a stack viewing cone, drop-down menu, an operating system left-hand info pane, etc A context manager 406 may be included to provide a task-oriented workspace that tracks the context within which a user is working. A context is the set of all of the objects, tools, applications, and data that is relevant to a particular task that the user is performing. In some implementations, contexts can be recalled instantly and can also be shared with other people. For example, a collection of emails about planning a party could be a context.

A notification manager 408 can provide to the user system and application notifications 124 (FIG. 1) indicating that something has happened. In some implementations, notifications from applications are provided to the user through the notification manager 408. The notification manager 408 prioritizes system and application notifications and then provides them through visualization manager 402. In some implementations, a history manager 410 records (e.g., in a single record) what has happened on the computer. As described below in greater detail, history manager 410 can function as a smart, deep UNDO utility that can determine what was done when, and how to undo it. History manager 410 features operations such as like UNDO, BACK, and versioning. The history manager 410 can also be populated with external events, such as news headlines and weather.

History manager 410 builds, stores, and indexes a deep representation of user computer actions. In one implementation, history manager 410 is a low-level aspect of context association system 100 to provide one mechanism for all history, whether it is user computer activity history, application history, or even external history (such as news events).

Figure 5:
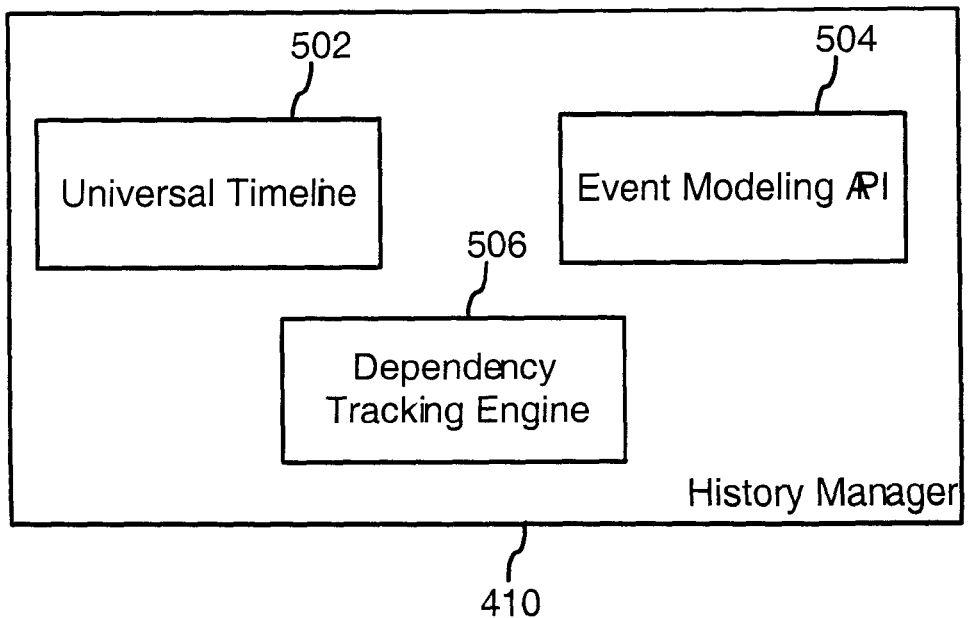
FIG. 5 is a detailed block diagram of one implementation of a history manager included in the user interface system of FIG. 1.

FIG. 5 is a block diagram of one implementation of history manager 410, which includes a continuous, scalable, universal timeline 502 in which user computer activity history, application history, etc. are represented at a variety of levels, from atomic keystrokes to entire weeks' worth of work. The user can view, query, and manipulate the history in virtually any time scale.

Applications and system services interact directly with an event modeling API 504 to add events to timeline 502. Events could include lower-level actions together with context that could be provided by the application and context association system 100. For example, event modeling API 504 could record keystrokes that are entered into a word processor, together with a context from the word processor that the keystrokes correspond to footnote text. This event might also be associated with other editing changes into a single "edit document" event that spans an entire day. As another example, an email client application could add a record of an email message being opened, complete with context about the sender, the subject, and the thread. The system might add additional context about what other applications are open at the same time and how long the email message remains open and visible on the display screen.

A dependency tracking engine 506 could employ one or more schemas to represent changes and their dependencies. Dependency tracking engine 506 could use these schemas to provide users with flexibility in their temporal navigation tasks. For instance, subsequent changes to an object are rendered irrelevant if a user goes back in the history to delete the object. In one implementation, dependency tracking engine 506 can also track casual changes and dependencies between events. For instance, if a user resizes every photo in a directory and then performs an undo of the initial size change and re-does it differently, dependency tracking engine 506 could hypothesize that the user wants to undo and redo the size changes on all of the other images. In addition, dependency tracking engine 506 can track where computer objects originated and the context when they were created. As a result, changes made to root documents can be propagated throughout an inheritance chain.

Some of these features are currently available in some in version control systems, such as Visual Source Safe, available from Microsoft Corporation. In some version control systems users see the entire history of a document and can also have limited ability to add and remove specific changes to and from a document. The difference is that version control systems lack semantic knowledge about what changes are made. For instance, while it could record that a .cpp file and a .h file have been modified, a conventional version control system does not know that taken together, these two changes altered the name of a property on an object.

Figure 6:
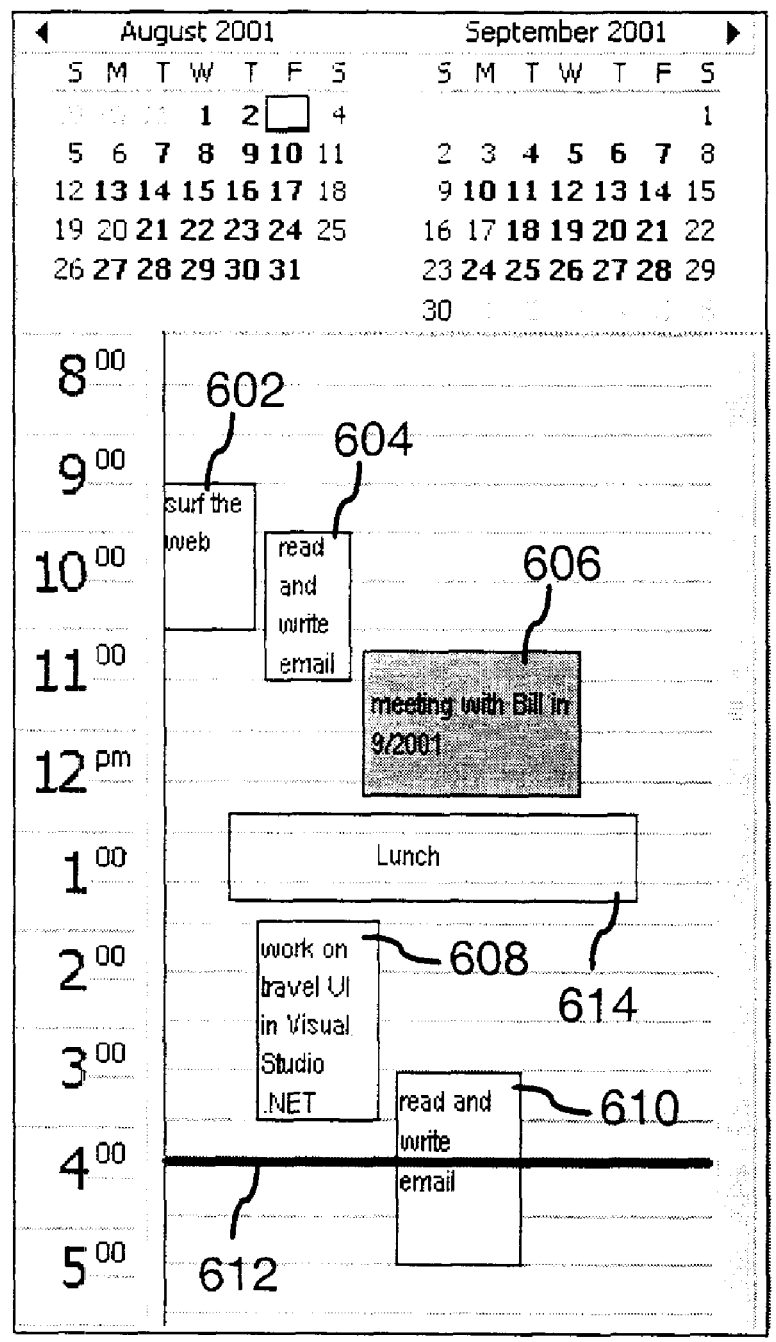
FIG. 6 is an illustration of one implementation of a one-day calendar-based deep history display that is rendered on a computer display screen.

FIG. 6 is an illustration of one implementation of a one-day calendar-based deep history display 600 that is rendered in a journaling format to show what a user did in a day. Event 602 indicates that the user surfed the web, and event 604 indicates that the user read and sent email. Event 606 indicates that the user had a meeting with Bill. Event 608 indicates that the user worked on a project called "travel UI," and event 610 indicates that the user has been and is currently reading email. The bold line 612 at about 4:20 is a NOW marker that indicates the current time. Events 602, 604, and 608 are represented in a completed format (e.g., white boxes) to indicate that those events are completed (i.e., have ended).

Event 606 is represented in a "scheduled" format (e.g., dark shading) to indicate a scheduled event. Event 614 is represented in a "surmised" format (e.g., background shading) to indicate the event is surmised by context association system 100. For example, the user had no computer activity from 12:30 PM until 2:00 PM, so context association system 100 surmises that the user is at lunch during that time lunch during that time. Likewise, the background shading portion of event 610 below NOW line 612 indicates that context association system 100 surmises that the user will take an additional hour to finish reading email.

It is noted that some of the tasks of FIG. 6 overlap in time. For instance, the user was surfing the web (event 602) while also checking email (event 604), two unrelated tasks. Also, context association system 100 could combine the use of different applications (e.g., opening a software development tool, a web browser, help files, a word processor, etc.) into a single event 608 based upon the high degree of association between the applications during that time.

The calendar basis of deep history display 600 makes it convenient for users check to see what they did in any given time span. They can also schedule tasks in the future, as is done with a conventional calendar. Meetings, appointments, phone calls, tasks, and other reminders can exist into the future.

Figure 7:
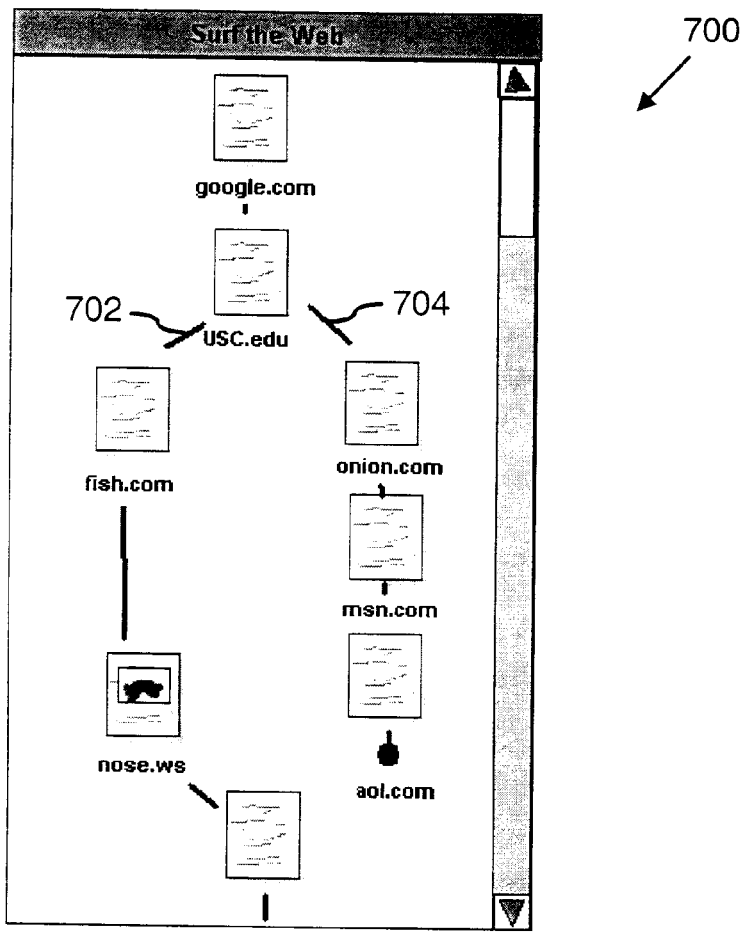
FIG. 7 is an illustration of one implementation of a detailed history viewing display that is rendered on a computer display screen.

FIG. 7 is an illustration of one implementation of a detailed history viewing display 700 that is rendered on a display screen as a detailed history relating to event 602 (FIG. 6), for example. Detailed history viewing display 700 could be accessed by graphically activating (e.g., clicking on) event 602. Detailed history viewing display 700 shows a history in a tree format, with branches 702 and 704, of the web surfing of event 602.

Detailed history viewing display 700 can help a user return to a desired web site based upon a rough recollection of when it was seen relative to others. Detailed history viewing display 700 provides a task-specific representation of a sequence of events. In the illustrated example, it is a tree of Web pages viewed with a web browser. In other contexts, detailed history viewing display 700 could be a sequence of commands and edits for a word processing document or a tree of thumbnails for a photo editing application. Detailed history viewing display 700 enables users to find items based on whatever cognitive markers they desire, thereby allowing users to access computer information based upon typically innate co-occurrence associations.

Figure 8:
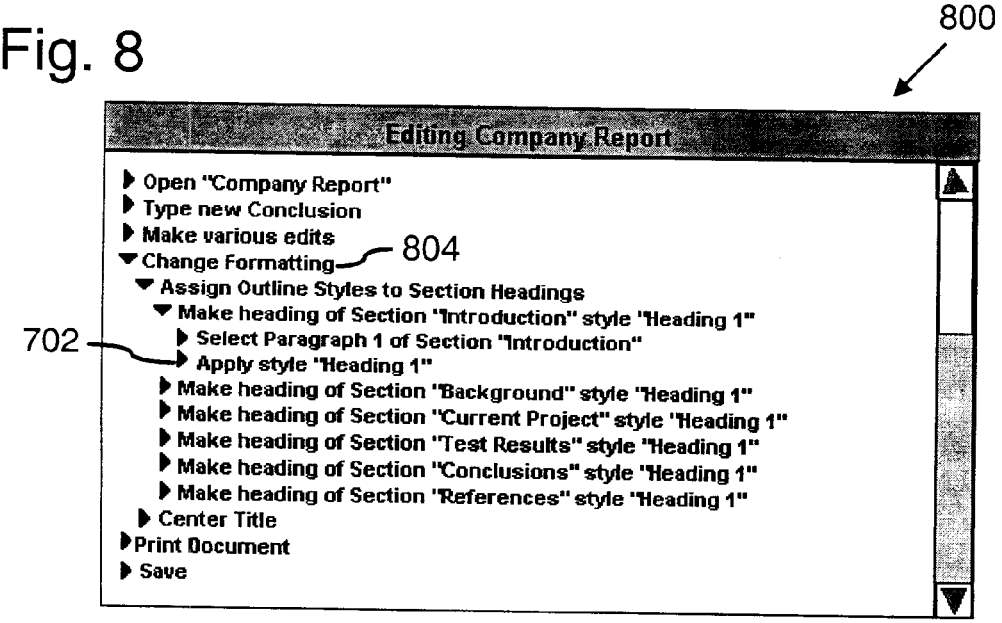
FIG. 8 is an illustration of one implementation of a detailed history editing display that is rendered on a computer display screen.

FIG. 8 is an illustration of one implementation of a detailed history editing display 800 that is rendered on a display screen in connection with editing a document referred to as "company report", for example. Detailed history editing display 800 allows a user to select and return to an arbitrary point in the history of the context. For example, the user could return to and change an event 802 corresponding to formatting the first paragraph in each section to be the style "Heading 1". After saving and printing the document, the user notices that the wrong style was applied and should have been "Heading 2."

The user can again open detailed history editing display 800. By default, the history window lists high-level tasks, such as opening, editing, formatting, and printing the document. The user expands the view of "Change Formatting" event 804 to see the actual command. At this point, the user can simply change "Heading 1" to "Heading 2". From this change, context association system 100 can also infer that the user might want to make the same change to the other headings, and do them all at once. These changes will be done without affecting other formatting or edits that occurred afterwards. Context association system 100 can isolate these changes because it has a dependency schema for each event.

Figure 9:
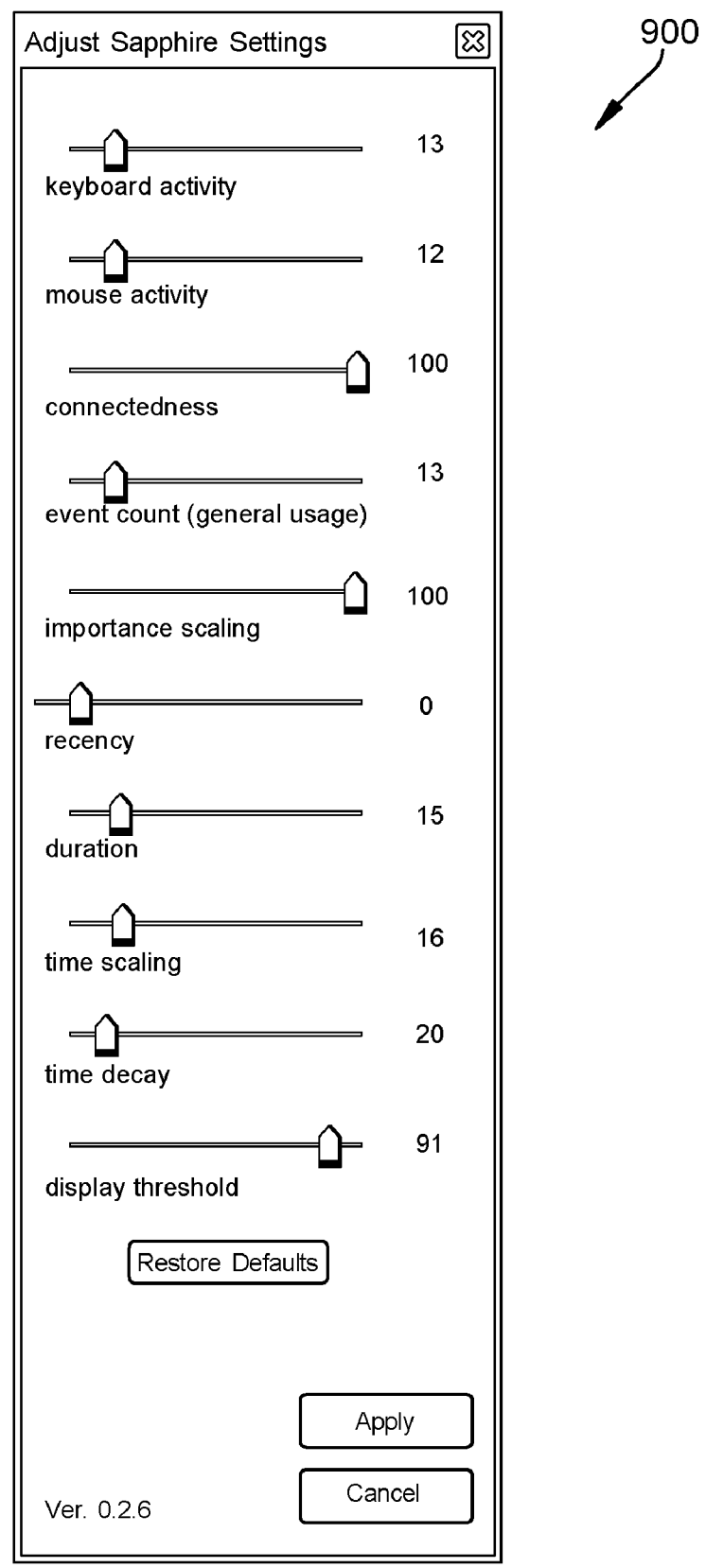
FIG. 9 illustrates an exemplary association control panel that can be rendered so that a user can select and control the manner of determining associations between files and user activities.

FIG. 9 illustrates an exemplary association control panel 900 that can be rendered by visualization manager 402 of context association user interface system 116 so that a user can select and control the manner of determining associations between files and user activities. In particular, association control panel 900 allows a user to select or specify relative weights to be applied to a variety of factors in determining associations between computer objects, information, etc.

In the exemplary illustration of FIG. 9, association control panel 900 employs graphical slide bars for effecting user selections. It will be appreciated, however, that association control panel 900 could be implemented with any other computer input (e.g., graphical) controls. Association control panel 900 includes controls for selecting the weight or significance to be applied to, for example, user keyboard activity, user mouse activity, connectedness between objects (e.g. number of associated objects), event count (e.g., how important is the number of events for the given object), importance scaling (e.g., a measure of significance to be applied to the importance of an object relative to other measures), recency (e.g., time since an object was used), duration (e.g., how long the object was used from an initial usage to a last usage), time scaling (e.g., importance of all time measures compared to other measures), time decay (e.g., how quickly strength of association and object values decay with time), and display threshold (e.g., a number that specifies how many associations to show). It will be appreciated, however, that these weighting factors are merely exemplary. In other implementations of association control panel 600, any or all of these exemplary controls could be used, or other controls as well.

As described above, applications 204 running on a computer could register with context association system 100 (e.g., via event handler 202) to receive enhanced document management functionality. Applications 204 can obtain from relationship processing system 108 information about associations between their respective documents (i.e. documents they can open, edit or otherwise access) and any other documents stored locally or across a network. This can provide integrated association information about different documents and document types by providing related documents to users based on context and irrespective of the document type and which application 204 is currently active. As a result, context association system 100 provides enhanced the usability and navigability of the computer system in its entirety.

For example, a word processing application 204 that is registered with context association system 100 could be used to open or access a word processing document. As a further illustration, the most recent prior action on the document could have been the imbedding of an image in the document, this user action information having been previously stored in database 106 as "high recency" information. Upon the opening of the document, the word processing application 204 could request from context association system 100 information associated with current context of the computer system or the immediate past context of the document itself.

In connection with the immediate past context of the document, context association system 100 could obtain from database 106 the information relating to the imbedding of the image (e.g., the embedding of the photo based upon recorded user actions and the file or network location from which the file was obtained). The information is passed to association system 110, which identifies a list of other similar photo images co-located in the same storage space as the original location of the imbedded photo. The co-located similar photo images may be opened automatically by interface system 116, thereby providing information associated with the immediate past context of the document.

In connection with the current context of the computer system, the word processing application 204 could deliver to context association system 100 a search request for related text documents (e.g., sharing certain keywords with the current document) or web pages (e.g., matching the keywords and the file location of the imbedded photo). These context associations with other applications can facilitate continued user work on the word processing document, thereby reducing time required for the user manage content and enhancing productivity.

In another example, a calendar application 204 for scheduling meetings could register with context association system 100 and request a search for and retrieval of documents related to a past meeting listed in the user's calendar. The request may be based upon specific criteria relating to the time of an event and its importance. Association system 110 identifies from database 106 a list of high importance documents (e.g., high activity and high usage or open time) being edited on the computer during a time period (e.g., one week) prior to the meeting. The calendar application could also query context association system 100 for all publicly accessible stored documents associated with (e.g., authored by) other meeting attendees who are considered important to the user. Importance of or extent of association with people may be based upon contact or communication history (e.g., email, instant messaging, etc.) with a selected user, as described below in greater detail. The documents identified by these requests could be listed together for convenient access by the user.

In yet another example, a user may have had open one or more documents or files in different applications 204 when the user viewed a certain network page or range of network pages with a web browsing application 204. If the user then returns to the certain network page or range of network pages, web browsing application 204 could ask the context association system 100 to open or list those documents or files to make them available if the user chooses to access them. Those documents or files or their listing may then be closed automatically if they have not been acted upon by the time user directs the web browsing application 204 to another network page.

In still another example, applications 204 can register with context association system 100 to request that the number of associated documents or files provided automatically be limited based on a calculated importance of the associated documents or files. In this context, importance may be determined by association system 110 based upon any number of factors, including recency of access, number of edits, sending or receipt of the document from a frequently contacted user, etc., or based upon security privileges associated with the documents or files in the computer operating system.

In addition, applications 204 can control these importance calculations as related to their specific document types (i.e., applications can control how data about their documents are collected and weighted for calculating future associations). For example, in weighting or calculating the 'importance' of an email document, the email application can instruct context association system 100 to pay particular attention to the 'reply' action on a document when it is detected, thereby modifying or overriding other calculations of importance. Each application 204 uses a standard interface to context association system 100 to instruct it how to interpret recorded actions and discern associations.

Furthermore, each application 204 can register with and request that context association system 100 perform tasks on behalf of the application even when it is not running. Such an application 204 could also specify actions context association system 100 is to perform when documents for the application are used by other applications. For example, a photo viewing application may ask that photos be assigned a higher importance for the photo viewing application whenever the photos are emailed by an email application. Moreover, applications can ask the context association system 100 for its current context of documents to determine which document (e.g., photo) to open when the application is launched, other than simply the last-opened document of the application type. The application might ask automatic context association system 100 to automatically identify and sub-group large groups documents that are associated with the application and stored together and sub-categorize them, thereby to simplify later navigation by the user.

Social Map Illustration

As described above, context association system 100 automatically determines context associations between user computer activities, computer objects (e.g., files, contacts, etc.), and other events. The following is a detailed description of an implementation of context association system 100 directed to providing context associations between people who use computers in some manner to communicate with each other.

Figure 10:
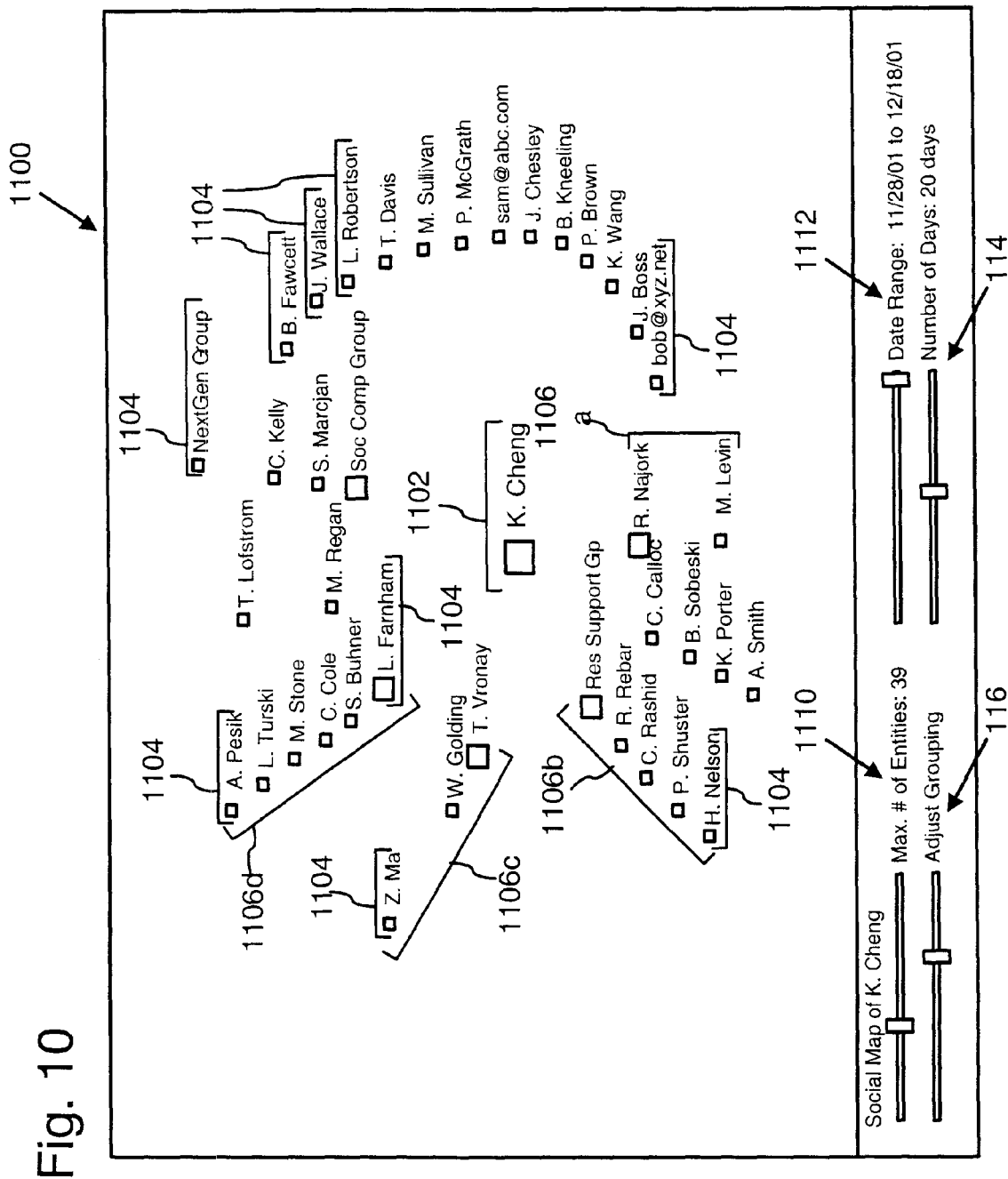
FIG. 10 is an illustration of an exemplary social map visualization as rendered on a computer display screen.

FIG. 10 is an illustration of an exemplary social map visualization 1100 as rendered on a computer display screen. Social map visualization 1100 illustrates and is based upon measurements of the extent of association between people who are identified individually or as groups or members of groups. In the illustrated implementation, the associations between people are based upon computer communications between the people, specifically email communications. Alternatively, other communication formats or information may separately or additionally form the basis for measuring the extent of association between people.

Social map visualization 1100 is formed in relation to a selected user or person, who is indicated by a selected user symbol 1102 and a username ("K. Cheng"). Social map visualization 1100 includes multiple associated user symbols 1104, with usernames, that correspond to other people with whom the selected user is associated. In the illustrated implementation, associated user symbols 1104 are rendered in a radial sector format (e.g., "pie slices") that include clusters 1106a, 1106b, etc. of associated users who are commonly associated in group. Clusters 1106a, 1106b, etc. are referred to generally as clusters 1106. Social map visualization 1100 corresponds to a social space for the selected user that corresponds to selected user symbol 1102 and allows inferences to be made as to the importance of people and groups, informal relationships between people, and dynamic grouping.

Social map visualization 1100 is based upon automatically generated association measures between people using computer communication information. The computer communication information may include any or all of dynamic email information, distribution list membership and data, public discussion threads, instant messaging contacts, meeting attendees listed on online calendars, people or contacts with whom documents are shared, memberships in online communities, groups, games, profile information, etc. The data coming from different modes of communication, etc. can be weighted differently and dynamically varied depending on the context of use. With respect to public discussion threads (i.e., places where multiple users can contribute to the same topic), for example, it may be assumed that people contributing to the same thread share similar interests and that the number of common topics can be a measure of similarity. Social map visualization 1100 provides users with dynamic representations of patterns within their social space using those association measures.

As an alternative to the sector visualization format illustrated in FIG. 1, social environments may be modeled with a network metaphor in which each item is represented in terms of its relationships to other items, as described below in greater detail. A network approach can also automatically provide users with dynamic representations of patterns within their social spaces and a means for navigating through them. Both visualization formats enhance the user's ability to seek out social information and manage their online social relationships.

Figure 11:
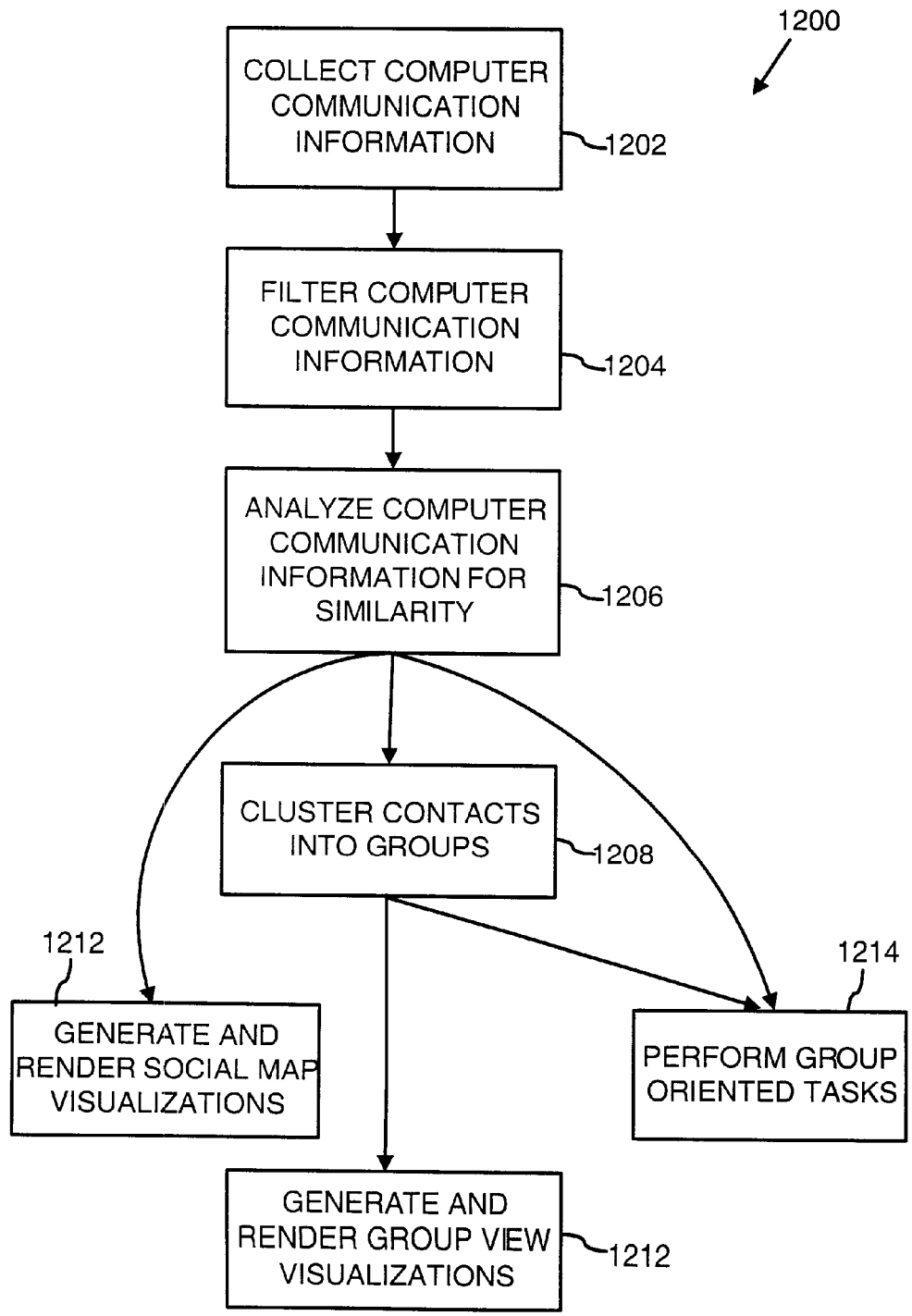
FIG. 11 is a flow diagram of a social map method for generating and rendering visualization of a social map based upon computer communication information.

FIG. 11 is a flow diagram of a computer software implemented social map method 1200 for generating and rendering visualization of a social map based upon computer communication information. In one exemplary implementation, the computer communication information is obtained primarily from email message, however other implementations may employ other computer communication information, as described below. For example, social map method 1200 could use any number of data sources, including client- or server-based email systems (e.g., Outlook® and Exchange® software programs), Internet- or Web-based email services (e.g., Hotmail® email services), instant messaging systems, and other communication or organizational applications.

Process block 1202 indicates that computer communication information is collected relating to multiple people or compute users who are in communication with each other. For example, the computer communication information may be collected automatically, without direct user input. Moreover, the computer communication information may be collected dynamically (i.e., repeatedly or periodically) to capture changes in the computer communication information that occur over time.

In one implementation, the computer communication information is obtained from email messages, particularly identifiers of who sent and was sent email messages, as indicated in email headers. Commonly, the person who sent an email message is indicated in a "From:" field, and the person or persons who receive the email message are indicated on a "To:" field and a "Cc:" field, the latter typically indicating a secondary recipient of the message. The computer communication information may be obtained for all email messages transmitted or received during a specified time period for any grouping or email users: specifically identified users, all users served by a specified email server, all users served by a specified email domain, etc.

In another implementation, the computer communication information includes email distribution list memberships, which represent interaction patterns that can model the social structures of an organization and relationships of other people to the organization. Such distribution list memberships may be maintained on an email server or a generalized network directory, such as a network directory based upon the Lightweight Directory Access Protocol (LDAP). The Active Directory™ feature in some Windows® network operating systems available from Microsoft Corporation is an example of such a generalized network directory. In addition, the distribution list memberships may be further combined with organizational and user-generated information, such as project teams, research groups, research topics, etc.

Process block 1204 indicates that the computer communication information is filtered according to one or more preselected criteria, so that the number of people (i.e., contacts) associated with the selected user may be reduced if the number is excessive. Personal social networks tend to be too large for all contacts to be included in a visualization of the network.

With regard to an implementation based upon email messages, for example, the preselected criteria may include any or all of the number of email messages in which a person or contact is listed as a sender or recipient, whether the person or contact was sent an email message by the selected user, and the relative recency of email messages to the person or contact.

In one implementation, filtering may be based upon number of occurrences, roles played, and time period. The number of occurrences for each individual is the number of times that person appears as a recipient or sender of an email. People may be sorted by the number of occurrences, and the N-number of people with the greatest number of occurrences may be selected for inclusion. For example, visualization 1100 (FIG. 1) may include a user-operable graphical entity count control 110 (e.g., a slider) with which a user can select the number N of people to be included.

The roles played indicates whether the person has ever been directly emailed by the owner of the email inbox and whether the person has ever directly emailed the owner of the email inbox. People may be filtered out if they have never been directly emailed by the email inbox owner so as to eliminate people who send unsolicited email. The time period is the range of time over which the email messages to be included are transmitted. For example, visualization 1100 (FIG. 1) may include one or more user-operable graphical time period controls, such as controls 1112 and 1114 with which a user can select a specific time range or a time period duration, respectively. This allows social map visualization 1100 to show how it changes over time. In one implementation, a default time period is 120 days.

With regard to an implementation based upon email distribution list memberships, for example, a generalized network directory may be filtered for members of an organization or a part of it. Then a search may be conducted for all distribution lists that have some members from the organization.

Process block 1206 indicates that the computer communication information is analyzed to determine extents of similarity between the people or contacts. In one implementation, a measure of similarity is determined between every pair of people or contacts.

With regard to an implementation based upon email messages, for example, the similarity between two people may be defined as the number of email messages on which they co-occur. In one implementation, two measures of similarity are defined: local and global similarity. Both measures range from 0 to 1, where 1 corresponds to perfectly similarity.

Local similarity is the similarity between two people normalized such that it is 1 if those two people always co-occur 0 if they never co-occur. Local similarity $LS_{ab}$ between two people (person's a and b) is equal to twice the co-occurrence frequency ($N_{ab}$) of those two people divided by the product of the individual occurrence frequencies ($N_a$ and $N_b$) for those two people:

$$LS_{ab} = (N_{ab})/(N_a * N_b)^{1/2}$$

The local similarity indicates a proportion of occurrences in which the two people occur together. It will be noted that two people can be very similar to each other (e.g., co-occurring 100% on all emails on which they appear) without frequently occurring in the user's inbox.

Global similarity $GS_{ab}$ is the similarity between two people normalized such that it is 1 if those two people always co-occur and 0 if they never co-occur. It is equal to the co-occurrence frequency of those two people divided by the maximum number of occurrences for any person. This number provides a measure of the importance of the person/cluster to the user.

$$GS_{ab} = N_{ab}/N_{total}$$

With regard to an implementation based upon email distribution list memberships, for example, similarity between people may be defined as the number of distribution lists on which they co-occur. (Conversely, similarity between groups may be defined as the number of shared members.) Also, similarity measures may be weighted by the size of the group, such that people are less similar if they share membership in large groups than in small groups. As an alternative to weighting them by size, groups such as distribution lists may be weighted by their usage. Usage is often inversely related to size (large groups tend to be used less) and, as a weighting factor can eliminate inactive groups.

The number of distribution lists on which two people co-occur corresponds to the extent to which their group memberships overlap. Groups may include any or all of distribution lists, research groups, project teams, research topics, etc.

The impact of each group on the similarity measure depends on the size of the group, such that a smaller group size would lead to people being more similar. Similarity values are calculated separately for each group type (distribution list, research group, research project team, research topic, etc.) and are then combined using a weighted sum.

Below is one formula that may be used for weighting the similarity values depending on the size of the groups. The function strongly weights groups ranging between 0 and 110, and then drops suddenly between 110 and 25 so that by the time groups are about 30 they have very small weights.

$$\text{weight} = \frac{1}{2} - \frac{1}{\pi} \arctan\left(-3 + \frac{1}{10}(\text{number\_of\_people})^{\frac{6}{5}}\right)$$

Similarity between groups is measured by the extent to which they share the same members. The impact of each person on the similarity measure depends on the number of other groups to which that person belongs, such that a smaller number of group memberships carries a higher weight.

Process block 1208 indicates that people or contacts are optionally clustered into groups through cluster analyses. The clustering analysis is related to the desired final task, not the initial data. For example, cluster analyses may be used to provide a sector view and to perform some group-oriented tasks, but are not required to determine social maps generally. In the exemplary implementations described above, a sector view is used as a default visualization for email data and a map view is used as a default for distribution list data. However, the view may be switched for each data set.

In one implementation, every person is at first placed in his or her own cluster. The similarity between every pair of clusters is the local similarity between the people in those clusters. Then, the two closest clusters are merged. The new similarity between the merged cluster and every other cluster is calculated using the standard average linkage method from cluster analysis, described in Cluster Analysis, Quantitative Applications in the Social Sciences, Aldenderfer, Mark S. & Roger K. Blashfield, Sage, Beverly Hills, 1984. Finally, this merging process is repeated until a certain tolerance level has been achieved (i.e., where the clusters must be similar enough to be clustered together). The tolerance level may be set by the user, and may be adjusted interactively by viewing how it affects the social map. For example, visualization 1100 (FIG. 1) may include a user-operable graphical clustering control 116 with which a user can select the tolerance level for clustering.

In one implementation, a modified form of hierarchical cluster analysis is used to group people together if they share a high degree of similarity. Hierarchical cluster analysis is described in Cluster Analysis, Quantitative Applications in the Social Sciences, Aldenderfer, Mark S. & Roger K. Blashfield, Sage, Beverly Hills, 1984. The operations of steps 1204, 1206, and optionally 1208, may be referred to as a data processing phase of method 1200.

Process block 1210 indicates that a group view visualization of a social map is generated and rendered on a computer display screen. In one implementation based upon email messages, for example, people and groups are represented with a sector view, as illustrated in FIG. 1. The sector view is most easily understood with a pie chart metaphor. As illustrated in FIG. 1, visualization 1100 is rendered with respect to a selected user symbol 1102, which is positioned generally centrally in visualization 1100. Each cluster 1106 of people or contacts 1104 is positioned in its own radial section or wedge of "pie."

Within each cluster 1106, contacts 1104 are arranged with a distance from central selected user symbol 1102 that is inversely proportional to the global similarity of each contact 1104 with the selected user. As a result, contacts 1104 with greater similarity are positioned closer to selected user symbol 1102. The contacts 1104 of different clusters 1106 may be rendered in different colors to further indicate their relationships and to distinguish them from adjacent clusters.

In addition to providing a representation of similarities between contacts and groups of them, visualization 1100 includes the functionality of a conventional alphabetic contact list. User interactions with visualization 1100 may include navigation, re-clustering, and emailing. For example, user's can graphically activate (i.e., "click on") any contact 1104 in visualization 1100 to designate that contact as the selected user 1102. As a result, visualization 1100 re-rendered based upon the newly designated selected user 1102, which is rendered centrally with the remaining contacts arranged in a sector view relative thereto based upon similarities.

The clustering algorithm in one implementation assigns each contact other than the selected or "centered" person to exactly one group. Re-clustering centered on any user provides a way to go beyond the single group assignment. By selecting or centering any contact, one may visualize all the different groups the person is associated with. Alternatively, one may use different clustering algorithms that may not have this limitation.

User's can re-cluster contacts 1104 by selecting different clustering tolerance levels with graphical control 116 (FIG. 1). Users can initiate an email message to any contact 1104 or cluster 1106 by activating an alternate graphical selection (e.g., a "right-click") and selecting from among a menu of options that include initiating an email message to the specified contact 1104 or cluster 1106. Initiating an email message may include opening a new email message window and populating the "To:" field with the specified contact 1104 or cluster 1106. Features of the present invention may be associated or integrated with email client software.

As another implementation, the visualization may include a list view in which contacts, groups, and clusters are listed, such as in a text table. The contacts, groups, and clusters may be identified by name, for example, and the table may include additional information such as level of similarity, contact information, etc. In addition, the contacts, groups, and clusters in the list view may be selectively sorted by name, level of similarity, etc.

Process block 1212 indicates that a non-clustered visualization of a social map is generated and rendered on a computer display screen based upon the analysis of computer communication information provided at process block 1206. A non-clustered visualization of a social map may be generated and rendered without the clustering analysis of process block 1208. In one implementation, people and groups are represented with a graph view, as illustrated in FIG. 3, for example, and described in greater detail below.

Process block 1214 indicates that group oriented tasks may be performed without any explicit visualization being rendered. One example of such a task is a dropdown menu in an otherwise conventional email client (e.g., Outlook® personal information management software available from Microsoft Corporation), the dropdown menu providing suggested additional names based on the similarity association with the names already on the To: or Cc: line of an email being composed. Another example is an "email the group" item as a right button click menu selection. Another example is a contact manager on a handheld computing device that orders the names by their importance/frequency of use, thereby making the best use of the limited screen area. As shown in FIG. 2, the group oriented tasks may or may not use the results of the clustering analysis of process block 1208.

As another implementation, computer tracking of communication information may be applied to telephonic communications, such as those tracked by computing devices integrated in some telephone systems or telephone handsets (e.g., mobile or cellular telephones). For example, some digital mobile telephones include integral, computer-controlled call tracking features and address book features. The call tracking features can function to provide automatic computer tracking of telephonic communication information, including telephone numbers called and telephone numbers from which calls are received. In some cases, these tracked telephone numbers are correlated with telephone numbers stored in the integral address book in the telephone.

Social map method 1200 may generate or use social mapping in connection with computer tracking of telephonic communication information. As one example, contacts listed in a mobile telephone address book, together with a history of calls made to or from them, may be downloaded from the mobile telephone to a computer operating social map method 1200. As a result, the social map generated by social map method 1200 can include and incorporate the computer-tracked telephonic communication information with computer-based communication information. Alternatively, social map method 1200 can be applied to computer-tracked telephonic communication information alone.

In another example, a social map that is generated by social map method 1200 may be downloaded to a telephone system or a mobile telephone so that names in the address book can be selectively ordered by their importance/frequency of use. This implementation can simplify making calls to related people. The social map may be generated with or without computer-tracked telephonic communication information.

Figure 12:
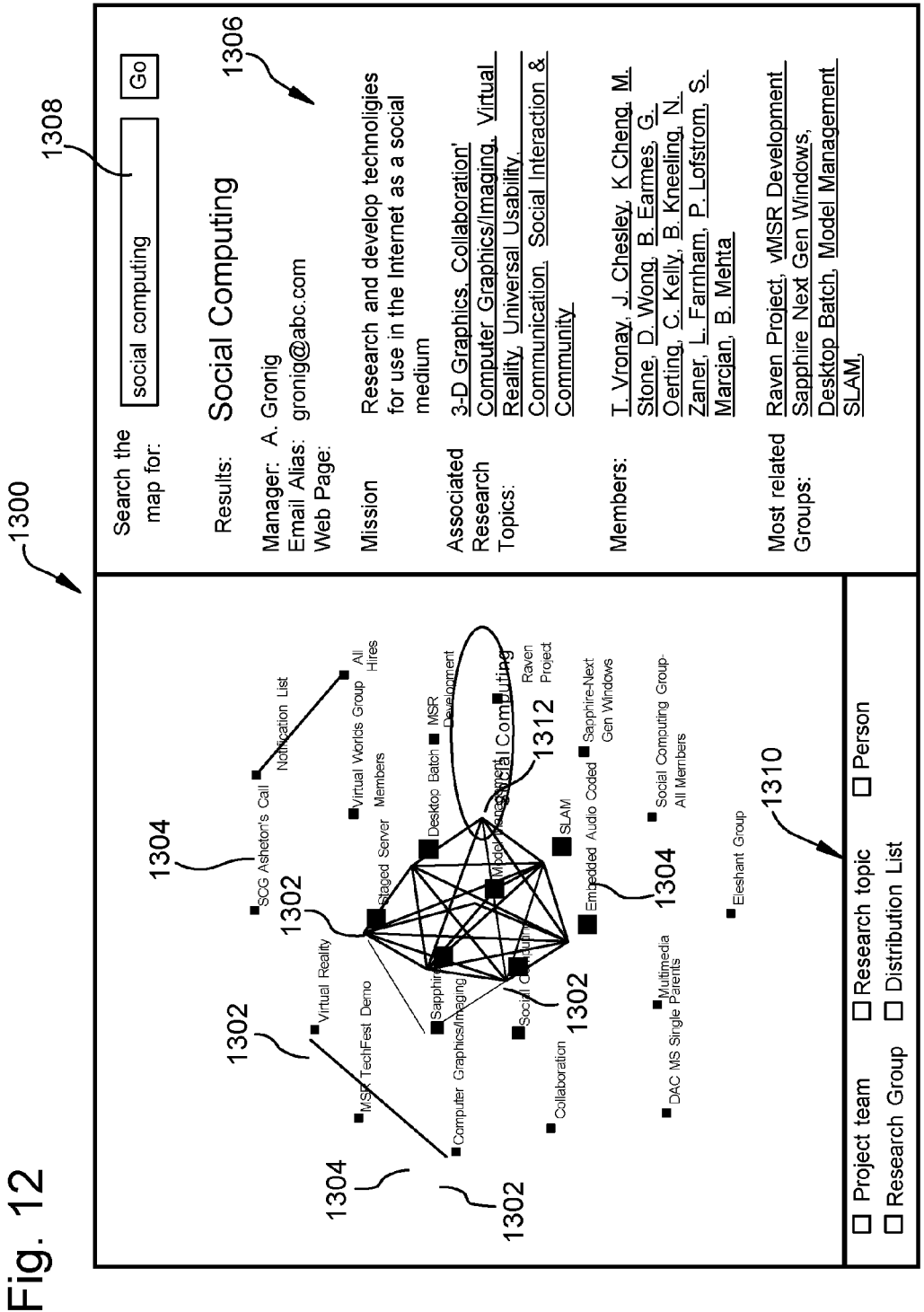
FIG. 12 is an illustration of another exemplary social map visualization as rendered on a computer display screen.

FIG. 12 is an illustration of an exemplary social map visualization 1300 as rendered on a computer display screen. Social map visualization 1300 includes a graph view of a network of nodes 1302 and connections 1304. People and groups are placed on the graph as nodes 1302 so that the strength of the relational tie between people and between groups is represented by distance on the graph, and lines 1304 are drawn for the stronger relational ties. For example, social information may be rendered onto a 2-dimensional plane using an algorithm similar to that of a spring model, in which the error between actual similarity values and distances between items is minimized.

Social map visualization 1300, sometimes referred to as a connections map, provides users with a social map that allows them to navigate for information using the connections between people and groups. Each node 1302 in visualization 1300 corresponds with profile information that may be displayed in a profile window 1306, for example. Users may search for information in the connections map 1300 by entering text into a "search" text box 1308, by graphically activating (i.e., "clicking on") nodes 1302 or connections 1304 in the map, or by clicking on information in the profile section 1306. In addition, nodes 1302 may be rendered with different colors that indicate the type of contact or group represented by the nodes, with a node color key 1310 (shown in black line format) indicating which node colors correspond to the type exemplary contacts or groups project team, research group, research topic, distribution list, and person.

Once it is selected, an item will appear near the center of the map 1300, items similar to it will appear around it on the map, and a profile of the selected item is rendered in profile section 1306. In the illustrated example, a search for "social computing" results in a selected node 1312 (circled for clarity) being rendered with its associated nodes 1302 and connections 1304. Profile section 1306 includes information about the group, including its manger, mission, associated research topics, and members. The underscored associated research topics and members in profile section 1306 are separate items that may be "clicked on" or activated to generate a corresponding visualization 1300. Profile section 1306 may also include a listing of the most closely related, or similar, contacts.

Users can explore the network for deeper information by graphically activating (i.e., "clicking on") the nodes 1302 and the connecting lines 1304. In one implementation, a user may graphically "hover" (i.e., position a graphical cursor, without activating it) over a node 1302 for a contact to have displayed group memberships for the contact. The group membership information may be rendered in a pop-up box, such as of the type sometimes referred to as a "tool tip." A user may graphically hover over a line 1304 between two contacts 1302 to have displayed overlapping group memberships of the two contacts. A user may graphically hover over a group to have displayed the members of that group. A user may graphically hover over a line between two groups to have displayed the overlapping members in the groups.

In one implementation a spring model is used for the graph visualization 1300. The spring model is described by Tomihisa Kamada and Satoru Kawai in: An Algorithm For Drawing General Unidirected Graphs, Information Processing Letters 31 (1989) 7-15. With the model, the objects of the graph are assumed to be connected by invisible springs, which have a rest length corresponding to the similarity of the objects: the closer the relationship, the shorter the spring. Ideally, if all the distances are to be at their preferred length, the structure would need to be represented in N−1 dimensions, but a satisfactory 2-dimensional representation can be achieved by minimizing the total energy of the springs. The total energy in the spring model may be expressed by the formula:

$$E = \sum_{i \neq j} \frac{1}{2} k_{ij} (r_{ij} - l_{ij})^2$$

where $r_{ij}$ is the distance between objects, $k_{ij}$ is the spring constant, and $l_{ij}$ is the spring rest length.

Two properties of this formula should be pointed out. When the distances between objects grow large, the energy of the system grows as the square of the distance. That keeps the objects confined to a limited area (which is good for on-screen presentation), but it also represents a non-local interaction, i.e. the object's position may be heavily affected by the objects on the other side of the graph. On the other hand, when the distance between objects goes to zero, the spring energy goes to a finite value. It means the repulsive force of the springs is not enough to prevent the objects from coming on top of each other, which may affect graph readability.

The spring model is satisfactory for a small number of objects (approximately 2 to 10) that are all related to each other. The spring model is less satisfactory when applied to a larger set of objects. In particular, problems can arise with graph sections (i.e., individual objects or tightly coupled clusters of objects) that are loosely coupled to other sections. The naïve expectation is that unrelated or loosely related sections should appear next to each other and separated by as large gaps as possible. The resulting graphs had the sections overlapping each other, with the distance between unrelated objects often much less then between the related ones, as illustrated in FIG. 13.

Figure 13:
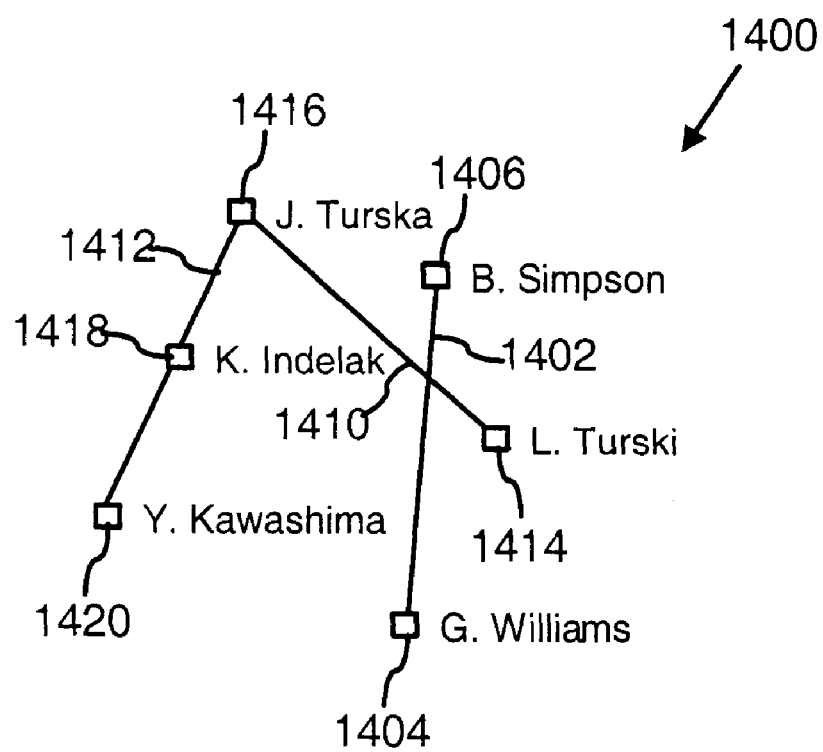
FIG. 13 shows a section of a graph view based upon the spring model defined above and rendered on a two-dimensional display.

FIG. 13 shows a section of a graph view 1400 based upon the spring model defined above and rendered on a two-dimensional display. Graph view 1400 includes a line 1402 to represent similarity between contacts 1404 and 1406, and a pair of lines 1410 and 1412 to represent similarity between contacts 1414-1420. In graph view 1400 item 1406 is rendered too close to unrelated items 1414 and 1416 relative to their related items 1418 and 1420.

To correct these issues, the present model uses a combination of a repulsive force proportional to the inverse of the distance value squared ($1/r_{ij}^2$) and an attractive force growing linearly with the distance value. This is loosely based on the physical model for quark-quark interactions, where the first term is an electrostatic repulsion and the second one is a string-like confinement. In this model, the total energy is expressed by the formula $$E = \sum_{i \neq j} \left( \frac{Z}{r_{ij}} + \frac{1}{2} k_{ij} r_{ij}^2 \right)$$

Here, Z is a coefficient defining the strength of the repulsive term (using electrostatic analogy, it would be a product of electric charges). In general, Z should be a function of a pair of objects (i.e. $Z_{ij}$), but in this model Z is set to be a constant. Moreover, since the goal is to determine the positions of the objects at the energy minimum, rather than the energy value itself, any constant factor in the energy formula is irrelevant. Therefore, without lack of generality, the value of Z may be set to 1.

Coefficients $k_{ij}$ correspond generally to spring coefficients of imaginary springs connecting the objects. This is similar to the conventional spring model, except that the rest length of the springs is now assumed to be zero. However, due to the presence of the repulsive force, the distance between two objects at rest is given by the formula:

$$l_{ij}^3 = \frac{Z}{k_{ij}}$$

To position objects with greater similarity closer to each other, the coefficients $k_{ij}$ may be assumed to be proportional to the measures of similarity $s_{ij}$ ($0 \leq s_{ij} \leq 1$).

$$k_{ij} = k s_{ij}$$

The global coefficient k defines the scale of this model. The minimal distance between objects (i.e. the distance between two objects of similarity 1) is $\sqrt[3]{Z/k}$. To constrain or bound all objects in the graph to a display screen area, a focal point is defined with regard to the object that is located at the center of the graph and is referred to by all other objects. Accordingly, all other objects are connected to the focal point with an additional spring, which results in the following energy formula:

$$E = \sum_{i \neq j} \left( \frac{Z}{r_{ij}} + \frac{1}{2} k s_{ij} r_{ij}^2 \right) + \sum_{j \neq 0} \frac{1}{2} b r_{0j}^2$$

Now, $\sqrt[3]{Z/b}$ is an approximate size of the graph, and the ratio k/b defines the size of the clusters of related objects relative to the size of the whole graph (i.e., a clusterization ratio).

How people interact with a network will depend on the goals supported by the application. Examples of four forms of interaction that may be employed are those of a) exploratory navigation across the network, b) organization of information using network information (e.g., organize all my emails by dynamic cluster), c) communication with individuals and groups in the network (e.g., email everyone in this dynamic cluster), and d) searches/filtering/information retrieval using network relational information (e.g., "who am I most similar to in this network?" "Who do care about the most?" "Who is most important in this network?").

The two implementations are described hereinabove: one uses email behavior to dynamically create an interface that represents a user's personal social network, and the other provides a map of the connections between co-workers and work projects in an organization. Both implementations draw data from various data sources and use that data to develop mathematical models of social networks. These models are then used to develop graphical displays with which the user interacts.

The personal social networks are inferred by analyzing patterns in user email behavior. For example, similarities between people are measured through counts of how often their names co-occur in email messages. Users are then provided with personal social network visualizations that can be used as emailing and grouping tools, thereby fostering a user's easy navigation to and interaction with important individuals and dynamic groups.

The personal social networks are based upon the expectation that past email behavior will provide a fairly accurate approximation of who users care about, and how users implicitly cluster or organize contacts in their minds. Thus past email frequency and clustering behavior can be used to help future email and clustering behavior. It is also expected that patterns in personal social networks will allow users to search for specific emails or contacts and organize to their contact lists. Examples of these applications are illustrated by the following scenarios.

Scenario 1: Bob wants to call his friend Jerry, but does not remember Jerry's phone number. Bob's conventional alphabetic contact list has grown to the point of being cumbersome. Rather than search for Jerry's contact information through the standard alphabetical list, which is difficult to navigate and does not order by importance, Bob goes to his personal social map to see the 40 people he has most been in contact with in the last 120 days. Bob right clicks on Jerry's name and gets Jerry's contact information.

Scenario 2: Bob wants to create a Distribution List out of the names of the people who have been working on one of his projects. They have been emailing each other about the project extensively over the past week, so Bob knows they will be clustered together. Bob decides to sort his contact list by dynamic clusters. He right-clicks on the appropriate cluster and creates his Distribution List.

Scenario 3: Bob wants to email a person he emailed several times a few weeks ago. Bob cannot remember the person's name, but remembers that the person designated under "CC:" to receive several email Bob had sent to Joe. Bob types Joe's email alias in the "To:" field of his email message, right clicks and then clicks on an insert related people option. The person's name, Jim, appears in the "To:" field next to Joe's name.

Scenario 4: Bob wants to throw a surprise birthday party for his co-worker John. Rather then using their workgroup distribution list, which would include John and spoil the surprise, Bob starts with the dynamic cluster that happens to involve the same people. With a right click on the cluster, Bob creates a new mail with all the names pre-filled in the To: line. Then, Bob then deletes the John's name and adds John's wife instead. This example shows the flexibility associated with lightweight dynamic clusters compared to traditional distribution lists.

The map of the connections between co-workers and work projects in an organization allows users to explore relationships between co-workers and work projects. The map models the social structures of an organization (and the relationships of others who interact with the organization) using the interaction patterns encapsulated by distribution list memberships. For example, similarities between people are measured through counts of how often the people co-occur in groups, projects, work topics, and distribution lists.

This map provides users with a social map that allows them to navigate for information using the connections between people and groups. Each node in the graph corresponds with profile information that may be displayed in profile window 1306 (FIG. 3), for example. The map of connections may be implemented as a web site that is accessible within the organization. For example, the map may be generated by a module that is implemented as a COM object. Result of the map generation may be returned as XML data describing the positions of all the points on the map. The XML data may be is returned to the user's client computer where the final rendering takes place.

Users may search for information in the connections map by entering text into the "search" text box 1308, by graphically activating (i.e., "clicking on") items in the map, or by clicking on items in the profile section 1306. Once it is selected, an item will appear in the center of the map 1300, items similar to it will appear around it on the map, and a profile of the selected item is rendered in profile section 1306. Examples of applications of the connections map are illustrated by the following scenarios.

Scenario 1. Jane has no idea who is working on issues related to natural language processing in an organization. She goes to a web site implementing the connections mapping of this invention and types in "natural language processing" into the search text box 1308. From the resulting visualization 1300, she sees that "natural language processing" is primarily connected to a Natural Language Processing group, but that several people from other groups are also working within the domain of natural language processing projects. Furthermore, she notices that the natural language processing group has a strong connection to the Speech Technology group.

Scenario 2. Jane has a vague memory of learning about a 3D graphics project from someone she has met in an organization. She cannot remember the project name, but does remember the person's name. She goes to web site implementing the connections mapping and types in the person's name. She sees that he has worked on a project called the Virtual Works Platform. She toggles to the projects view, and by navigating along the links around the Virtual Works Platform she sees that most of the people who worked on that project now work on new projects.

Scenario 3: Jane has a question related to Chinese user interfaces that she wants to send an email about. She searches for "user interface" keyword and finds that the "Multimodal User Interface group" is probably the one she needs to talk to.

But this is a name of the group, and not a distribution list she can send an email to. She checks the map and finds that the closest distribution list with a cryptic name 'MSRCNUIe' shares most of the members with the Multimodal User Interface group and may be her best choice for the email.

People, their relationships, network clusters and network patterns may be represented to the user using a variety of methods. In addition to methods described in Aldenderfer, & Bashfield, 1984; referenced above, methods are also described in Card, S., Mackinlay, J., & Scheiderman, B. (1999). Readings in Information Visualization: Using Vision to Think. San Francisco, Morgan Kaufman Publishers., Freeman, L. C. Visualizing Social Networks. [http://carnap.ss.uci.edu/vis.html], and Wasserman, S., & Faust, K. (1994) Social Network Analysis: Methods and Applications. Cambridge, UK: Cambridge University Press. These methods vary in complexity, ranging from the simple link representations used in web pages, to complex diagrams modeled after neural nets. How networks are represented to the user will depend on the functionality of the application. For example, if the goal is to aid people in sorting their emails, dynamic clustering of emails could be represented to users simply through the order in which emails are listed in their inboxes.

Calendar-Based User Interface Illustration

As described above, context association system 100 automatically determines context associations between user computer activities, computer objects (e.g., files, contacts, etc.), and other events. The following is a detailed description of an implementation of context association system 100 directed to providing context associations through a calendar-based user interface.

In this implementation, context association system 100 provides access to system-wide monitoring of the user and associations between various files, people, and other information related to the user and the context. In particular, this implementation of context association system 100 utilizes a calendar as a top-level user interface for accessing computer information. It will be appreciated that this implementation of context association system 100 would also provide and include standard calendar operations, such as being able to view months or days, temporal navigation, etc., similar to the calendar in numerous conventional calendar programs.

For example, a user may remember what she was working on the day of a memorable event (e.g., a meeting, a storm, an earthquake), but not the month or day of the event. As another example, a user may remember being very busy working on a presentation, but not who was invited to the presentation. Context association system 100 provides a simple and fast way of automatically collecting time-based information, viewing the information, and searching the information, thereby providing access to computer-based information in a way that is much more compatible with how human memory actually works.

Figures 14, 15:
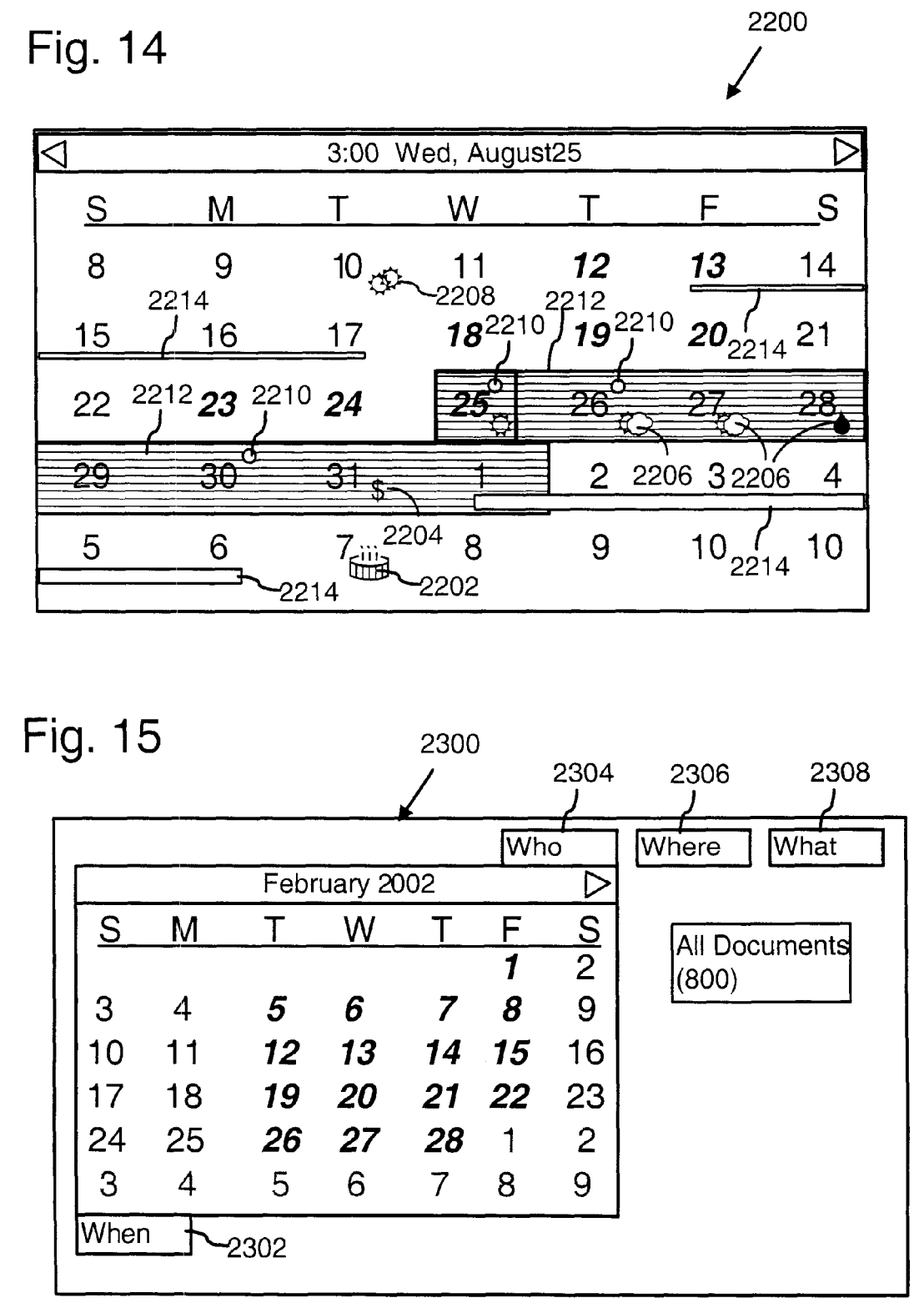

FIG. 14 is an illustration of an exemplary implementation of an overview calendar-based user interface 2200 rendered on a computer display screen by context association system 100. Overview calendar-based system user interface 2200 displays as an overview general activity levels over an extended (e.g., 5 week) period. Overview calendar user interface 2200 may be rendered as a default view, for example, when a user opens or accesses context association system 100. It will be appreciated that the extended period of overview calendar user interface 2200 may alternatively be of one or more months, or any number of weeks.

Overview calendar user interface 2200 provides the user with an abbreviated overview of his or her activity over the extended period. The abbreviated overview may include any number of information visualizations relating to events, occurrences, or other information to give the user generalized information that relates to, and can distinguish, different days. In the extended period, for example, one information visualization may assign a distinct font or text color (e.g., bold and italics, as shown for the dates Aug. 12, 13, etc.) to distinguish certain days (e.g., "busy" days) from regular or inactive days. For example, such "busy" days may be identified from metadata stored in computer system database 106 for each day relating to a combination of calendar appointments and the user's level of computer activity (e.g., amount of keyboard typing compared to an average day, number of files viewed, number of communications, etc.).

Overview calendar user interface 2200 may also include a variety of other information visualizations relating to information that is automatically supplied to or acquired by context association system 100. The information may relate to user computer activities, unusual or noteworthy events, or the user's geographic location, whether in the past or in the future. The information visualizations give the user generalized information that relates to, and can distinguish, different days.

As examples, image annotations 2202, 2204, 2206, and 2208 in the form of small images can be overlaid on calendar days to indicate an event or item on that day, whether in the past or the future. For example, a birthday could be indicated with a small picture 2202 of a birthday cake, a payday could be indicated by a monetary symbol 2204, or the weather could be indicated with a small icon 2206 of a cloud or the sun for current or future weather forecasts or a significant past weather icon 2208 could indicate a record hot day as a significant past event. Multiple image annotations could be placed on the same day, and the image annotations could also be composite images of other data. For instance, image annotations 2210 could each be a collage of photos that were taken on that day.

Background coloration 2212 for one or more days day can be changed to indicate information. For instance, weekends and holidays could be a different color from work days. The hue and intensity of the background coloration 2212 can be modulated to provide additional information. For example, days on which a user took more photos could be indicated with a darker blue background coloration 2212 than days on which no photos were taken.

Linear annotations or lines 2214 that span several days can be added to indicate data that has duration of more than one day. For instance, a vacation could be indicated by drawing a line from the start day to the end day. These lines can very in color and thickness to indicate additional meaning. For example, vacation could be shown in blue and business travel could be shown in red, or the thickness of the line 2214 could indicate how active the user was on the computer during those days. A very thin line could indicate low activity while a thick line could indicate high activity.

Text style variations can be used in rendering dates on the calendar. The text variations may include different text size or font face to indicate that the day is different (sample text style variations are indicated in FIG. 14 by bold and italics, for example). For instance, days on which a user had one or more meetings can be shown in bold and italic face. Furthermore, text annotations or descriptions (not shown) could also be added to the calendar, either by themselves or in conjunction with any of the above-mentioned visualizations.

Different annotations may be appropriate for denoting different types of information, but in some instances the use of particular annotations could be based on personal preferences of the user. Additional or more detailed information may be accessed from any annotation via a particularized data search.

Overview calendar-based user interface 2200 may be rendered with different amounts of time-related information according to the period of time being displayed. The visualizations included in the multi-week overview shown in FIG. 14 could be less detailed than an overview display for a shorter period of time (e.g., one day or one week). Also, overview calendar-based user interface 2200 that relates to the current user context (e.g., what is being searched, what is being viewed currently), as described below in greater detail. For example, if a user is viewing photos, information related to when the photos were taken and shared could be more easily accessible via the overview.

FIG. 15 is an illustration of an exemplary implementation of a "when" segment or tab 2302 of a calendar search user interface 2300 rendered on a computer display screen by context association system 100. Calendar search user interface 2300 applies context sensitive metadata relating to the user's current context (e.g., type of computer files being viewed or worked on) to summarize in a calendar view one or more days when events occurred relating to the current context.

As one example, the context could be that the user is viewing photos (i.e., computer files corresponding to photographs) when the user opens or accesses calendar search user interface 2300. Based upon the photo-viewing context when it is opened or accessed, calendar search user interface 1300 may render "when" tab 2302 as a default to show days of a current or default month (or another time period) on which photos were taken or stored. For instance, the days of the month on which photos were taken or stored could be rendered in bold and italics, as illustrated, or with any other distinguishing characteristics, such as a small thumbnail of one of the photos from that day (e.g., a photo of high importance) or the number of photos associated with that day. Accordingly, context association system 100 determines the particular context of a user and provides information related to that context when calendar search user interface 2300 is opened or accessed.

Calendar search user interface 2300 further includes a "who" segment or tab 2304, a "where" segment or tab 2306, and a "what" segment or tab 2308. Tabs 2304-2308 provide user interface affordances for constructing queries analogous to the user interface affordances described above with reference to "when" segment or tab 2302.

Figure 16:
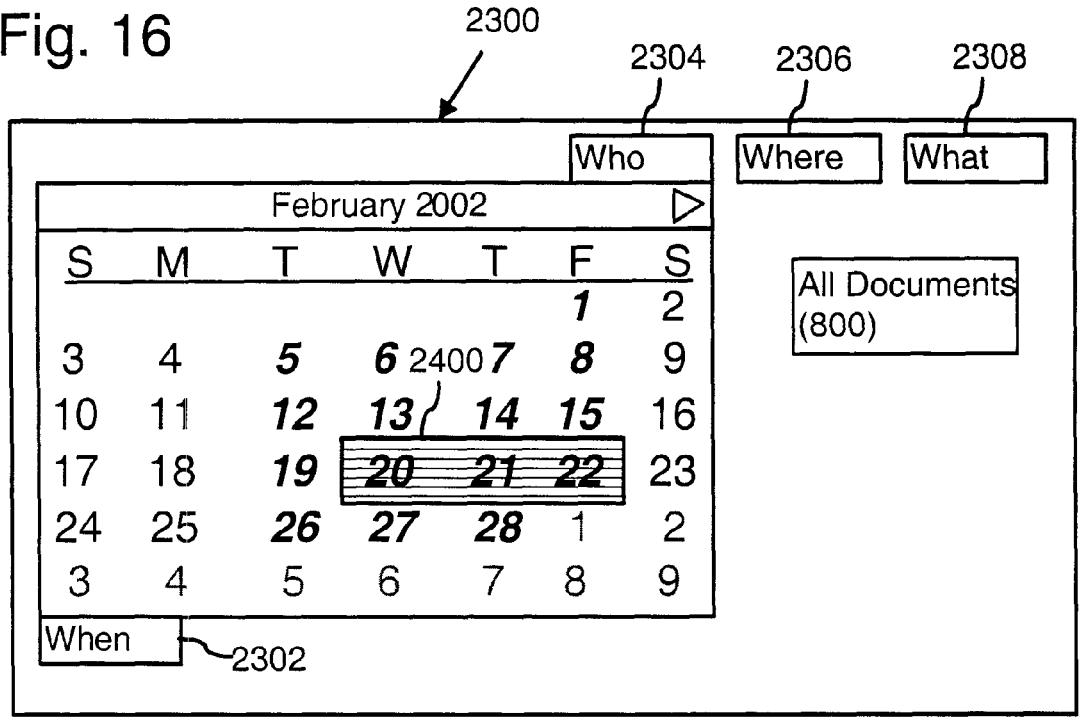
FIG. 16 is an illustration of an exemplary user query having been entered into the "when" tab of a calendar search user interface.

FIG. 16 is an illustration of an exemplary user query 2400 having been entered into the "when" segment or tab 2302 of calendar search user interface 2300. For example, the user can graphically select a day or a date range query 2400 that forms the basis for a query a query of computer system database 106 (FIG. 1). In this illustration, the selected date range 2400 corresponds to Feb. 20-22, 2002.

Results from the query (e.g., the photos that were created or stored within that date range) are delivered from computer system database 106 to chunking system 112, which "chunks" or groups the results. In an exemplary default implementation, chunking system 112 "chunks" or groups the results automatically according to the context or nature of the query (e.g., time or days in the illustrated example). Alternatively, the user may selectively override the default chunking and select another basis for chunking, such as the subject matter in the photos, for example.

Figure 17:
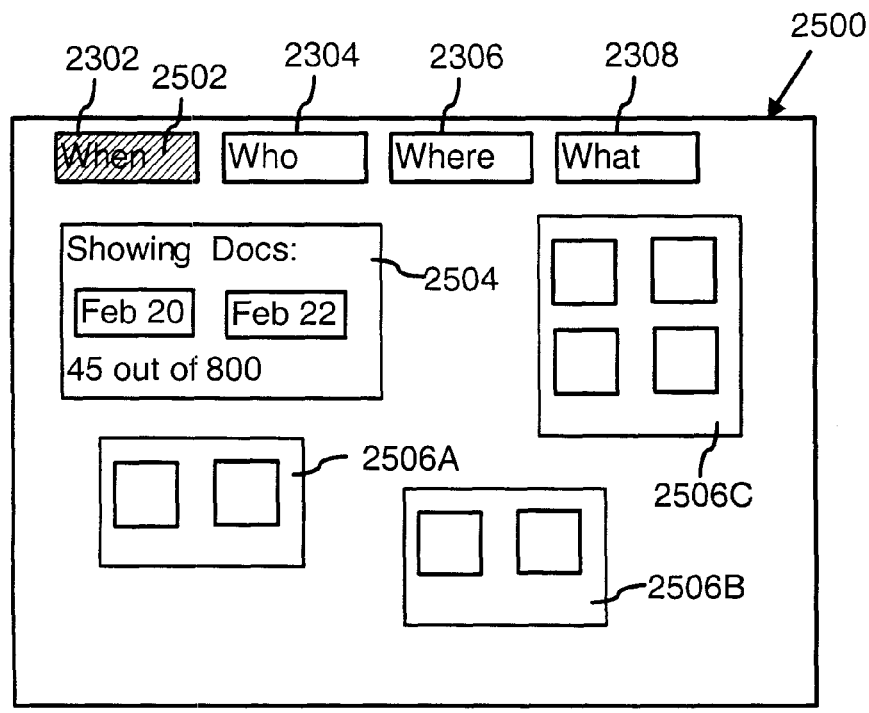
FIG. 17 is an illustration of an exemplary chunked query results display corresponding to the user query of FIG. 16.

FIG. 17 is an illustration of an exemplary chunked query results display 2500 corresponding to the user query 2400 of FIG. 16. Chunked query results display 2500 includes an indication 2502 that the query was conducted under the "when" tab 2302, together with a query pane 2504 indicating the basis of the query (e.g., documents dated between Feb. 20 and Feb. 22) and at least a portion of the results rendered in one or more chunks 2506A-2506C (e.g., three shown) that correspond to the query. In the photo-based example, chunks 506A-506C may correspond to the respective days Feb. 20, Feb. 21, and Feb. 22 of the query. In addition, each of chunks 2506A-2506C may include one or more thumbnails 2508, or other summarizing visualizations, corresponding to one or more of the higher-importance files assigned to the chunk.

It will be appreciated that the time-based metadata need not be added or entered by the user, but rather is It is created by the system automatically, such as during the file-creation process, or obtained during a file import (e.g., from a camera in the case of a photo). For instance, such a query operation could identify and locate a music file listened to by the user (e.g., last week) without the user having had to do anything beyond listening to the music file.

Figure 18:
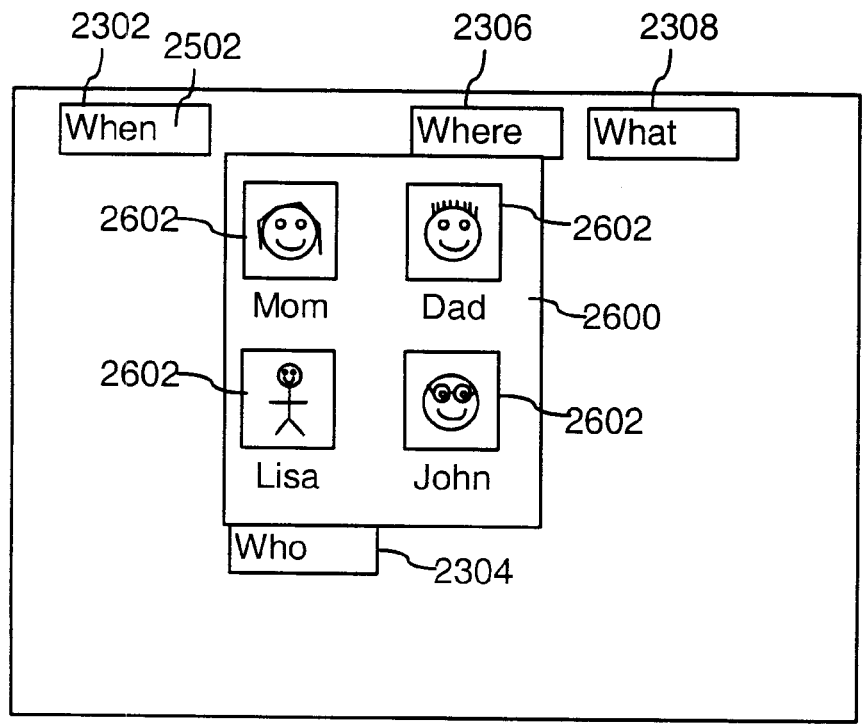
FIG. 18 is an illustration of an exemplary user query having been entered into the "who" tab of a calendar search user interface.

FIG. 18 is an illustration of an exemplary user query 2600 having been entered into "who" segment or tab 2304 of calendar search user interface 2300. With continuing reference to a query relating to photos, a search for photos of a person may be initiated from "who" segment or tab 2304, which may include one or more (several shown) thumbnails or other visualizations 2602 corresponding to each person who has been identified to context association system 100. Each thumbnail or visualization 2602 may include an identifier for the person and the number of photos or other documents corresponding to the person. For example, the user can graphically select one or more of visualizations 2602 to form a query of database 106.

Figure 19:
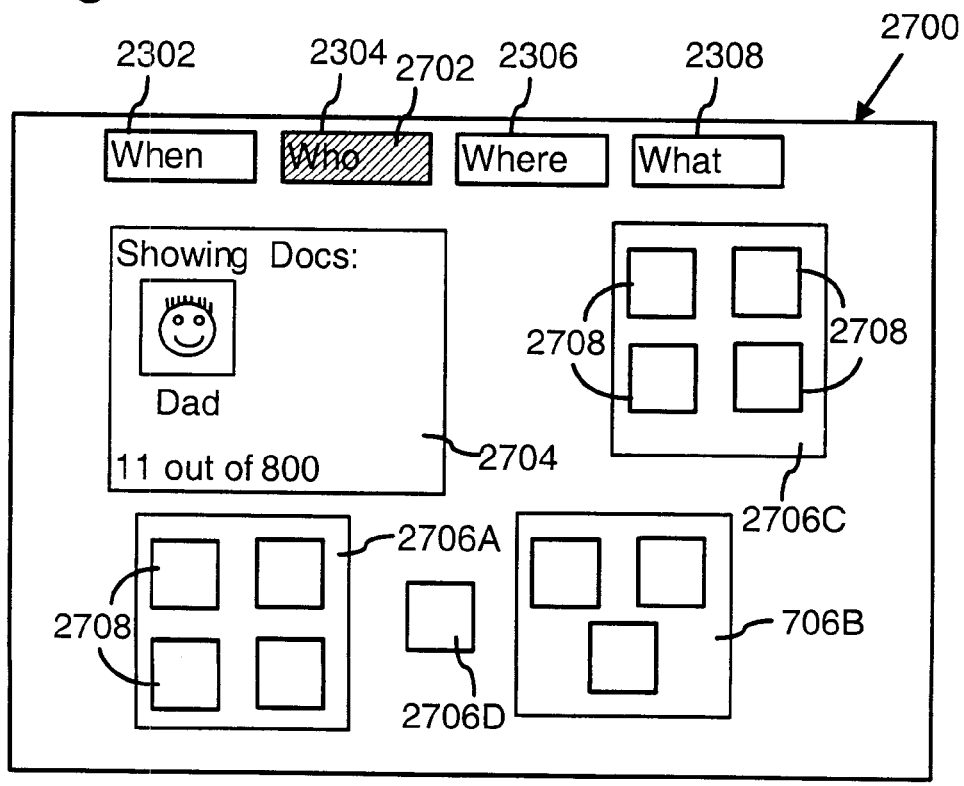
FIG. 19 is an illustration of an exemplary chunked query results display corresponding to the user query of FIG. 18.

FIG. 19 is an illustration of an exemplary chunked query results display 2700 corresponding to the user query of FIG. 18. Chunked query results display 2700 includes an indication 2702 that the query was conducted under the "who" segment or tab 2304, together with a query pane 2704 indicating the basis of the query (e.g., documents or photos showing Dad) and at least a portion of the results (e.g., all the results) rendered in one or more chunks 2706A-2706D that correspond to the query. In this example, chunks 2706A-2706D may correspond to different months in which the photos were created. In addition, each of chunks 2706A-2706D may include one or more thumbnails 2708, or other summarizing visualizations, corresponding to one or more of the higher-importance files assigned to the chunk, or all of the files.

Figure 20:
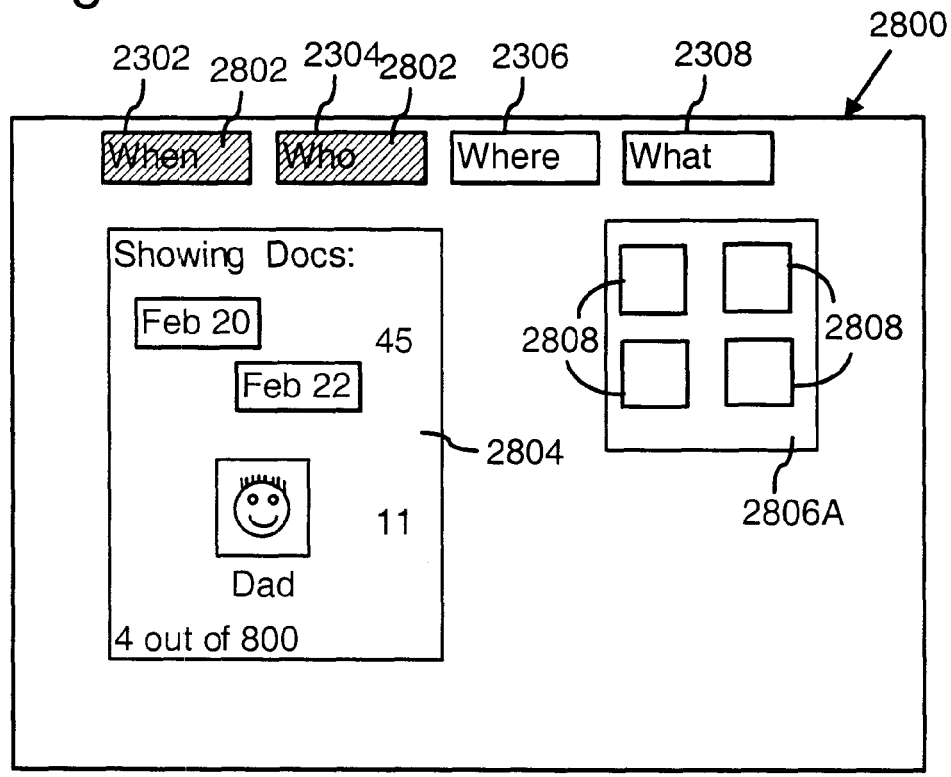
FIG. 20 is an illustration of an exemplary chunked query results display corresponding to a combination of the user queries of FIGS. 4 and 18.

FIG. 20 is an illustration of an exemplary chunked query results display 2800 corresponding to a combination of the user queries of FIGS. 4 and 6. As illustrated in FIG. 20, one or more visualization items can be added to query pane 2804, such as by a graphical manipulation (e.g., "drag and drop"), to further define a query.

Chunked query results display 2800 includes indications 2802 that the query was conducted under the "when" tab 1302 and the "who" tab 1304, together with a query pane 804 indicating the combined basis of the query (e.g., documents or photos dated between February 120 and February 22 and showing Dad) and at least a portion of the results (e.g., all the results) rendered in one or more chunks 806A (one shown). In this example, only chunk 806A is rendered due to the small number (i.e., four) of identified documents or photos. Chunk 806A includes thumbnails 808, or other summarizing visualizations, corresponding to each of the files assigned to the chunk.

Figure 21:
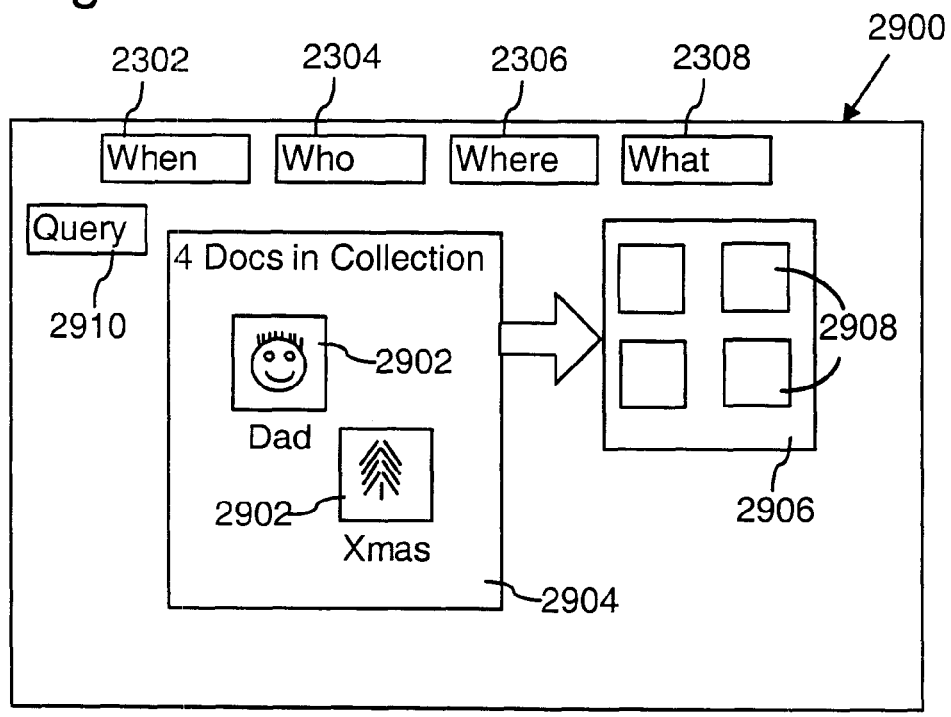
FIG. 21 is a schematic illustration of a metadata viewing interface in which metadata is rendered in a metadata pane for a chunk of items.

FIG. 21 is a schematic illustration of a metadata viewing interface 2900 in which metadata tokens 2902 (representing metadata) are rendered in a metadata pane 2904 for an item or a chunk 2906 of items 2908. Metadata 2902 would typically be accessed through a direct manipulation command, such as hovering with the mouse. The visualization of metadata 2902 may be similar to that of the tokens or visualizations from which queries are built. Some metadata 2902 can be removed or edited by users (e.g., file names could be edited), whereas other metadata would be fixed (e.g., file size). In the illustration of FIG. 21, chunk 2904 includes photos of Dad from Christmas.

It will be appreciated that metadata 2902 could be represented or rendered in ways other than metadata pane 2904. For example, metadata 2902 could alternatively represented as small icons directly on the items, or for instance on the "back" of the items, which could be represented by a user interface action for "flipping" over an item or pulling down a corner of it. In the illustration of FIG. 21, query pane 2910 is minimized and inactive once the user starts browsing the metadata 2902.

Figure 22:
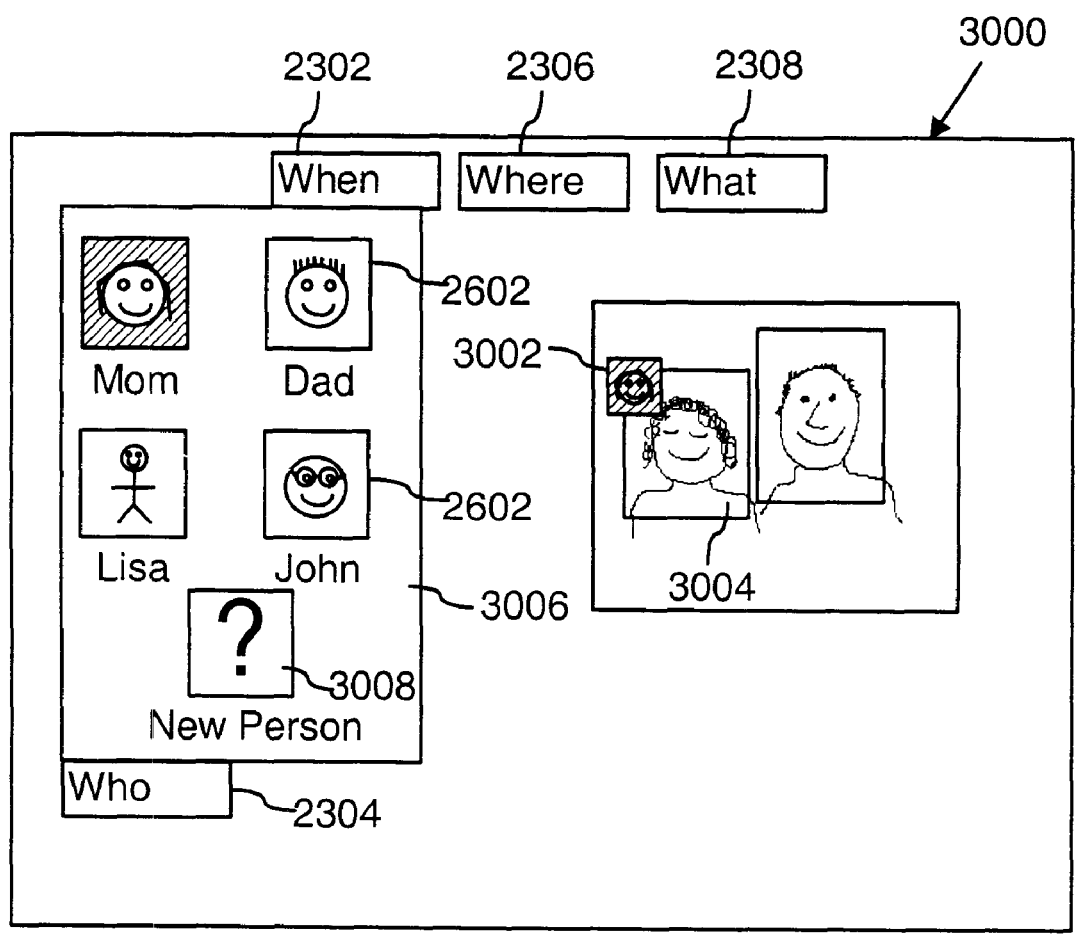
FIG. 22 is a schematic illustration of a metadata tagging interface in which metadata tokens are applied or tagged to files or other items.

FIG. 22 is a schematic illustration of a metadata tagging interface 3000 in which metadata tokens 3002 (one shown) are applied or tagged to files or other items 3004. A metadata token 3002 may be added to or associated with a file 3004 by a graphical "drag and drop" operation in which token 3002 is dragged from a metadata pane 3006 and dropped onto item 3004. A metadata token 3002 that is dropped onto a chunk is added to each item within the chunk.

In one implementation, context association system 100 can prompt the user to add metadata, with different types of metadata being associated with different file types. For instance, after a user imports photos, context association system 100 could run a face-detection algorithm over the images and sort them into chunks of different people. It could then prompt the user to provide annotation. In the illustration of FIG. 22, context association system 100 could identify two faces in the photo, highlight the faces, and brings up the "Who" drawer to let the user annotate them.

For a new person not currently in the system, the user would use or apply a "New Person" token 3008. Once "dropped" on the photo of the new person, "New Person" token 3008 will prompt the user to type a name for the person. The user could of course choose to leave the picture unannotated. In this case, the system would still "know" that there are two people in the picture—it would just not know who they are. So, it would be returned with a query for "pictures with people in them", but not in a query for "pictures of Lisa". The user could also assign arbitrary keywords to items, by dragging a blank out of the "What" drawer or tab. For instance, the user could annotate a collection of photos as "favorites".

Figure 23:
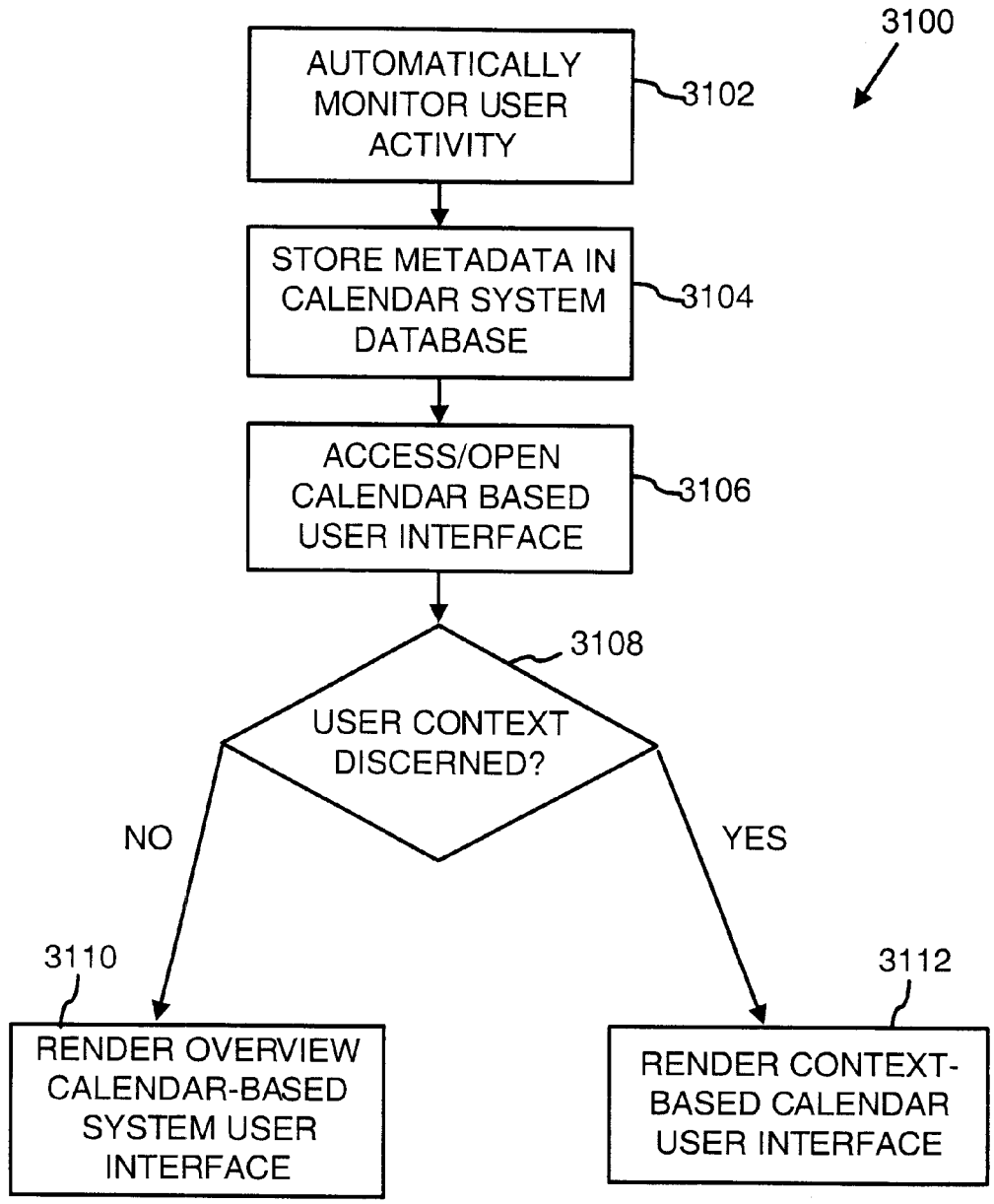
FIG. 23 is a flow diagram of a computer-implemented calendar-based interface method.

FIG. 23 is a flow diagram of a computer-implemented calendar-based interface method 3100 for providing computer users with a calendar-based view of activities and file actions and to use time as a filter of activities and file actions.

Process block 3102 indicates that user activity on a user-operated computer or computing device is monitored automatically. In one implementation, the monitoring of process block 3102 may include universal monitoring of input activity that provides a single entry point for all user interactions with the computer, or at least specified user interactions with the computer.

Process block 3104 indicates that information (e.g., "metadata") about computer files stored on and activities carried out on the computer or computing device are stored in a computer system database. The metadata may include, for example, any or all of the metadata fields described above with reference to computer system database 106 (FIG. 1).

Process block 3106 indicates that a calendar-based user interface is accessed or opened, such as by a user input or selection.

Inquiry block 3108 represents an inquiry as to whether a user context may be discerned from the monitored user activity of process block 3102 when the calendar-based user interface is accessed or opened (i.e., process block 3106). A user context could be discerned, for example, if a user is using or interacting with a software application or particular file types when the calendar-based user interface is accessed or opened. A user context could not be discerned, for example, if a user is not using or interacting with a software application or particular file types when the calendar-based user interface is accessed or opened. Inquiry block 3108 proceeds to process block 3110 whenever a user context is not discerned, and otherwise proceeds to process block 3112.

Process block 3110 indicates that an overview calendar-based system user interface (e.g., interface 1200) is rendered on a computer display screen with one or more visualizations relating to events, occurrences, or other information to give the user generalized information that relates to, and can distinguish, different days.

Process block 3112 indicates that a context-based calendar user interface (e.g., interface 1300) is rendered on a computer display screen based upon the discerned user context.

In accordance with the practices of persons skilled in the art of computer programming, the present invention is described above with reference to acts and symbolic representations of operations that are performed by various computer systems and devices. Such acts and operations are sometimes referred to as being computer-executed and may be associated with the operating system or the application program as appropriate. It will be appreciated that the acts and symbolically represented operations include the manipulation by a CPU of electrical signals representing data bits, which causes a resulting transformation or reduction of the electrical signal representation, and the maintenance of data bits at memory locations in a memory system to thereby reconfigure or otherwise alter the computer system operation, as well as other processing of signals. The memory locations where data bits are maintained are physical locations that have particular electrical, magnetic, or optical properties corresponding to the data bits.

Having described and illustrated the principles of our invention with reference to an illustrated embodiment, it will be recognized that the illustrated embodiment can be modified in arrangement and detail without departing from such principles. In view of the many possible embodiments to which the principles of our invention may be applied, it should be recognized that the detailed embodiments are illustrative only and should not be taken as limiting the scope of our invention. Rather, claim as my invention all such embodiments as may come within the scope and spirit of the following claims and equivalents thereto.

The invention claimed is:

1. A computer implemented relationship processing system for providing context associations between computer objects comprising the following computer executable components:
    an association system that determines a degree of a strength of association between at least a pair of computer objects and metadata obtained by a data collection system;

a chunking system that uses the degree of the strength of association determined by the association system for a set of objects and groups them into a number of subgroups;

a history manager that provides in a tree structure a representation of user activity on a user-operated computer, an application history and an external history, the history manager further comprising an ability to conduct a plurality of features operations on the representation activity, the application history and the external data history;

an importance calculator that determines an importance ranking between a target computer object and one or more other computer objects; and a generating component to generate a group view visualization that includes the set of objects arranged such that a distance from a particular object of the set of objects to a user selected object is inversely proportional to the strength of association between the particular object and the user selected object.

2. The system of claim 1, further comprising a user interface system that utilizes information determined by the association system, the chunking system, and the importance calculator to display information relating to objects stored or activities carried out on the computer.

3. The system of claim 2, in which the user interface system includes a context association control panel that provides user-control of a determination of association between at least a pair of computer objects.

4. The system of claim 1, in which the tree structure representation of user activity on the computer is editable by a user to effect changes in the user activities represented by the tree structure.

5. The system of claim 1, the association system is configured to determine a local similarity between pairs of the computer objects, the local similarity indicating a proportion of occurrences in the metadata in which the pair of objects occur together.

6. The system of claim 5, the association system is configured to determine a global similarity between pairs of the computer objects, the global similarity indicating a proportion of occurrences in the metadata in which the pair of objects occur together relative to a greatest number of occurrences in the metadata for any computer object.

7. The system of claim 1, wherein the generating component is configured to generate a map based upon the extents of the strength of association between the computer objects; and wherein the system further comprises a rendering component for rendering a visualization of the map on a computer display screen.

8. The system of claim 7, in which the visualization of the mapping includes a sector view to show extents of similarity between the computer objects.

9. The system of claim 8, further comprising a clustering component that clusters the computer objects into groups according to the extents of the strength of association between them, wherein the visualization of the mapping includes the groups.

10. The system of claim 9, the generating component generates the map as a connections map, the connections map includes a graph view of a network of nodes and connections wherein the nodes represent one or more of the groups.

11. A relationship processing method for providing context associations between computer objects, comprising:
analyzing metadata to determine extents of a strength of association between computer objects;
utilizing the extents of the strength of association to group the computer objects into a number of sub-groups;
mapping the computer objects based upon the extents of the strength of association between the computer objects;
determining an importance ranking between a target computer object and one or more other computer objects;
combining the strength of association, the importance ranking and a context comprising at least the computer objects to determine the context associations between the computer objects; and
generating a visualization of the mapping that includes the computer objects arranged such that a distance from each of the computer objects to the target computer object is inversely proportional to the importance ranking between each of the computer objects and the target computer object.

12. The method of claim 11, further comprising providing in a tree structure a representation of user activity on a user-operated computer in connection with one or more of the computer objects.

13. The method of claim 12, in which the tree structure representation of user activity on the computer is accessible through a calendar user interface; user activity on the computer is editable by the user to effect changes in the user.

14. The method of claim 11, further comprising rendering the visualization of the mapping for display on a computer display screen.

15. The method of claim 14, in which the visualization of the mapping includes a sector view to show extents of similarity between the computer objects.

16. The method of claim 11, further comprising:
clustering the computer objects into groups according to the extents of the strength of association between them; and
rendering a visualization of the mapping on a computer display screen and including the groups in the visualization.

17. The method of claim 16, further comprising filtering the computer objects according to one or more preselected criteria to maintain a number of them associated with each other at or below a selected threshold.

18. The method of claim 11, in which the computer objects include computer communication information relating to multiple contacts who are in communication with each other.

19. A system comprising:
a processor; and
a memory storage device including instructions that are executable by the processor to:
analyze metadata to determine extents of a strength of association between computer objects;
group the computer objects into a number of sub-groups based on the extents of the strength of the association between the computer objects;
map the computer objects based upon the extents of the strength of association between the computer objects;
determine an importance ranking between a target computer object and one or more other computer objects,
determine the context associations between the computer objects by combining the strength of association, the importance ranking, and a context comprising at least the computer objects; and
render a visualization of the mapping on a computer display screen, the visualization of the mapping including the computer objects arranged such that a distance from each of the computer objects to the target computer object is inversely proportional to the importance ranking between each of the computer objects and the target computer object.

* * * * *